United States Patent
Rajavel et al.

(10) Patent No.: US 11,392,606 B2
(45) Date of Patent: Jul. 19, 2022

(54) SYSTEM AND METHOD FOR CONVERTING USER DATA FROM DISPARATE SOURCES TO BITMAP DATA

(71) Applicant: Disney Enterprises, Inc., Burbank, CA (US)

(72) Inventors: Dakshinamurthi Rajavel, Burbank, CA (US); Guy Molinari, Burbank, CA (US); Ryan J. Junk, Burbank, CA (US); Rajagopal Baskaran, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 260 days.

(21) Appl. No.: 16/668,112

(22) Filed: Oct. 30, 2019

(65) Prior Publication Data

US 2021/0133203 A1    May 6, 2021

(51) Int. Cl.
| | |
|---|---|
| G06F 16/25 | (2019.01) |
| G06F 16/21 | (2019.01) |
| G06F 16/245 | (2019.01) |
| G06F 9/54 | (2006.01) |
| G06F 16/22 | (2019.01) |

(52) U.S. Cl.
CPC ........... *G06F 16/258* (2019.01); *G06F 9/54* (2013.01); *G06F 16/212* (2019.01); *G06F 16/2237* (2019.01); *G06F 16/245* (2019.01)

(58) Field of Classification Search
CPC .. G06F 16/258; G06F 16/2237; G06F 16/245; G06F 16/212; G06F 9/54
See application file for complete search history.

(56) References Cited

U.S. PATENT DOCUMENTS

| | | | | |
|---|---|---|---|---|
| 2008/0306984 | A1* | 12/2008 | Friedlander | G16H 10/60 |
| 2011/0270844 | A1* | 11/2011 | He | G06F 16/2237 |
| | | | | 707/745 |
| 2013/0031143 | A1* | 1/2013 | Katiyar | G06F 16/951 |
| | | | | 707/805 |
| 2015/0178336 | A1* | 6/2015 | Wang | G06F 16/2228 |
| | | | | 707/745 |
| 2015/0213463 | A1* | 7/2015 | Turner | G06F 16/24542 |
| | | | | 705/7.33 |
| 2017/0250968 | A1* | 8/2017 | Licht | H04L 63/08 |
| 2017/0357697 | A1* | 12/2017 | Gorjiara | G06Q 30/02 |
| 2018/0034824 | A1* | 2/2018 | Maycotte | G06F 21/6218 |
| 2019/0286620 | A1* | 9/2019 | Al-Haimi | G06N 3/0454 |
| 2020/0042507 | A1* | 2/2020 | Ji | G06F 16/2282 |
| 2020/0159708 | A1* | 5/2020 | Bi | G06F 16/278 |
| 2020/0202997 | A1* | 6/2020 | Hadad | H04L 9/0894 |
| 2020/0365274 | A1* | 11/2020 | Karl | G16H 10/40 |

* cited by examiner

*Primary Examiner* — Alicia M Willoughby
(74) *Attorney, Agent, or Firm* — McCormick, Paulding & Huber PLLC

(57) ABSTRACT

Methods and systems for converting user data from disparate sources to bitmap data are described, where user data from a plurality of different data sources are conformed to a conformed user data set using a conform mapping schema, and the conformed data set is then analyzed to create a bitmap mapping schema which provides a mapping from the conformed user data set to a bitmap data set. The conformed user data set is then converted to a bitmap data set using the bitmap mapping schema and the current user data in the conformed user data set. A query user interface (UI) may be provided to allow clients or others to query the resulting bitmap data set.

27 Claims, 19 Drawing Sheets

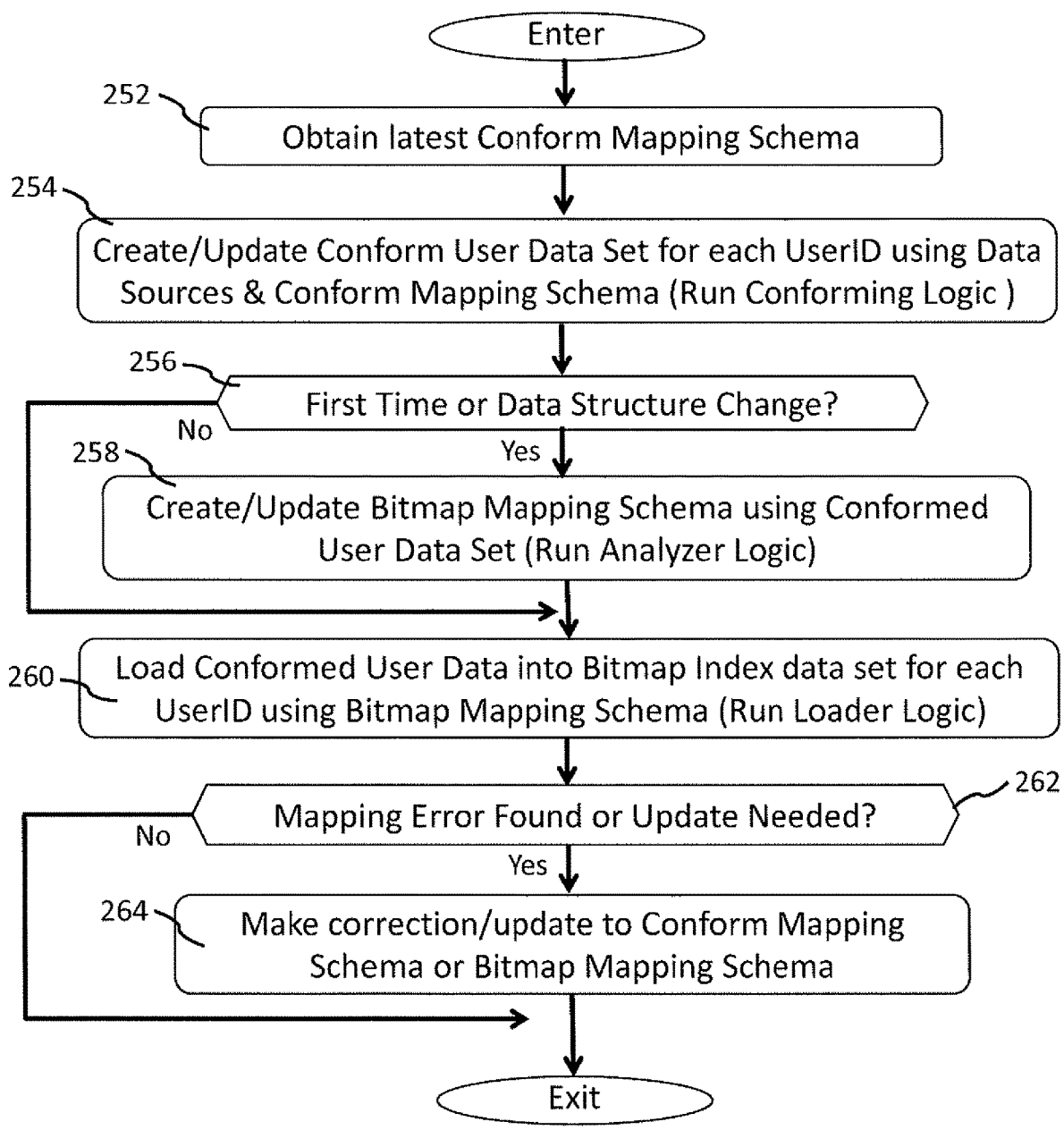

Fig. 4
Conform Mapping Schema

| Parent Attributes | Attribute Type | Child Attributes | Attribute Type | Attribute Description | Mapping Rule(s) (format: data source.field) | Example Value |
|---|---|---|---|---|---|---|
| user_id | string | | | ID - SWID is the Primary Identity (Fuse - ID, Clickstream_SOR - SWID). This has both Anonymous and Registered SWIDs | fans_sor.id, clickstream_sor.swid | {8615FD3F-6140-47D5-AA32-9C5F5B82D71F} |
| is_registered | boolean | | | If it is a registered swid then true else false | | TRUE |
| gender | string | | | Possible values : M, F, U | fans_sor.gender | F |
| age | int | | | Age | fans_sor.age | 22 |
| plays_fantasy | boolean | | | If the user plays fantasy games then set as True else False | fans_sor.hasfantasy | TRUE |
| stated_teams_favorites | array | | | | fans_sor.stated_teams_favorites | |
| | | team_id | int | Team ID's for which the user played | | 14 |
| | | team_name | string | Team Name's for which the user played | | GS Warriors |
| | | sport_id | int | Sport ID's for which the user played | | 46 |
| | | sport_name | string | Sport Name's for which the user played | | Basketball |
| | | sport_abbrev | string | Sport Name Abbreviation for which the user played | s3://dp-contentlink/sports/ | NBA |
| | | team_location | string | Team Location for which the user played | s3://dp-contentlink/teams/l | CA |
| stated_sports_favorites | array | | | | fans_sor.stated_sports_favorites | |
| | | sport_id | int | Sport IDs for which the user played | | 45 |
| | | sport_name | string | Sport Names for which the user played | s3://dp-contentlink/sports/ | Football |
| | | sport_abbrev | string | Sport Name Abbreviation for which the user played | | NFL |
| device_id | array | | | Refers to MAID or IDFA device IDs, complex type with additional information such as Device Category, Device | | 6A609B83-6611-4CC6-BAA3-7299481E3267 |
| | | device_id | string | | | |
| | | device_category | string | The Category of the device like tablet, handset etc | clickstream_sor.device.category | Tablet |
| | | device | string | The device name like ipad, notebook | clickstream_sor.device | iPad |
| | | device_manufacturer | string | Manufacturer of the device | clickstream_sor.device_manufacturer | Apple |
| location | array | | | Location details of the user | | |
| | | city | string | Location details of the user | clickstream_sor.geo_city | |
| | | state | string | | clickstream_sor.geo_state | |
| latitude | float | | | Latitude Position of the user location | | |
| longitude | float | | | Longitude position of the user location | | |
| content_activity | array | | | Source of the content | | |
| | | source | string | | | espn-clickstream |
| | | datetime_utc | string | Date Time in UTC | clickstream_sor.hit_date_utc | 2011-12-03T10:15:30-01:00 |
| | | device | string | Device Used | clickstream_sor.device | Android Handset |
| | | os_name | string | Operating system Name | clickstream_sor.os_name | Android |
| | | browser | string | Browser | clickstream_sor.browser | Android Browser |
| | | click_path_p1 | string | Click Path 1 | Data comes from Notebook using the script for navigation path split Logic: If(map.pattern_check = 1 AND pattern_cols_check = 1,split(navigation_method, '.')[1]. If(map.pattern_check = 1,split(navigation_method, '.')[0],NULL)) | indianapolis 500 on demand |
| | | content_type | string | To check content type for specific patterns | clickstream_sor.event.content_type | video |
| | | video_title | string | Title of the Video | clickstream_sor.video_title | ACC Wrestling Champs |
| | | story_title | string | Title of the Story/Article | clickstream_sor.story_title | "The Mayor" succeeds his way |
| | | audio_title | string | Title of the Audio | clickstream_sor.audio_title | All-Star Saturday Night |
| | | video_complete | int | Represents whether the content watched by user has the complete event | clickstream_sor.event_list,clickstream_sor.page_event If event_list pattern match for pattern ('^^2105 ^2110 ,2105 ,210 ,"') OR if page_event=51 and event_list has videocompleteeventbrodacast suite and pattern to construct and check with pattern we want finally sets to 1; if not sets 0" | 25000 |
| | | video_duration | int | Duration of the video | clickstream_sor.video_duration | 25000 |
| ads_activity | array | | | | | |
| | | source | string | | | |
| | | datetime_utc | string | Date Time in UTC | clickstream_sor.hit_date_utc | 2011-12-03T10:15:30-01:00 |
| | | advertiser_name | string | | | |
| | | creative_name | string | | | |
| | | device | string | | | |

Conformed User Data Set (Users1-N)

<User1> User ID1 # (All User1 Interactions):   506     510

| Attribute | Child Attribute | Type: | Value: |
|---|---|---|---|
| User ID | | string | B615FD3F-6140-47D5-AA32 |
| Gender | | string | M |
| Age | 502    504 | integer | 22 |
| Browser | | string | Google Chrome |
| Plays Fantasy | | Boolean | True |
| Device | | <array> | |
| | device ID | string | 6A6D9B83-6E11-4CCE-BAA3 |
| | device category | string | Tablet |
| | device manuf/brand | string | Apple |
| Location | | <array> | |
| | City | string | Miami |
| | State | string | FL |
| Latitude | | float | 24.8932 |
| Longitude | | float | 45.3241 |
| Stated Teams Favorites | | <array> | |
| | Team ID | integer | 14 |
| | Team Name | string | Miami Heat |
| Stated Sports Favorites | | <array> | |
| | Sport ID | integer | 46 |
| | Sport Name | string | Football |
| Content Activity | | <array> | |
| | Source | string | ESPN.com |
| | Date/Time | string | 3/11/19 11:00 |
| | Device | string | Android Handset |
| | Content type | string | Video |
| | Video Title | string | ACC Wresting Champs |
| | Audio Title | string | All-Star Saturday Night |
| | Story Title | string | 'The Mayor' Succeeds His Way |
| | Video Duration | integer | 25000 |
| Ads Activity | | <array> | |
| | Source | string | FantasySports.com |
| | Date/Time | string | 5/15/19 2:00 |
| | Device | string | Apple iPhone4 |
| | Advertiser Name | string | Honda |

* * *

.
.
.

<UserN> User IDN # (All UserN Interactions):

| Attribute | Child Attribute | Type: | Value: |
|---|---|---|---|
| User ID | | string | B617FD3F-6189-45D5-AA55 |
| Gender | | string | F |
| Age | | Integer | 31 |

* * *

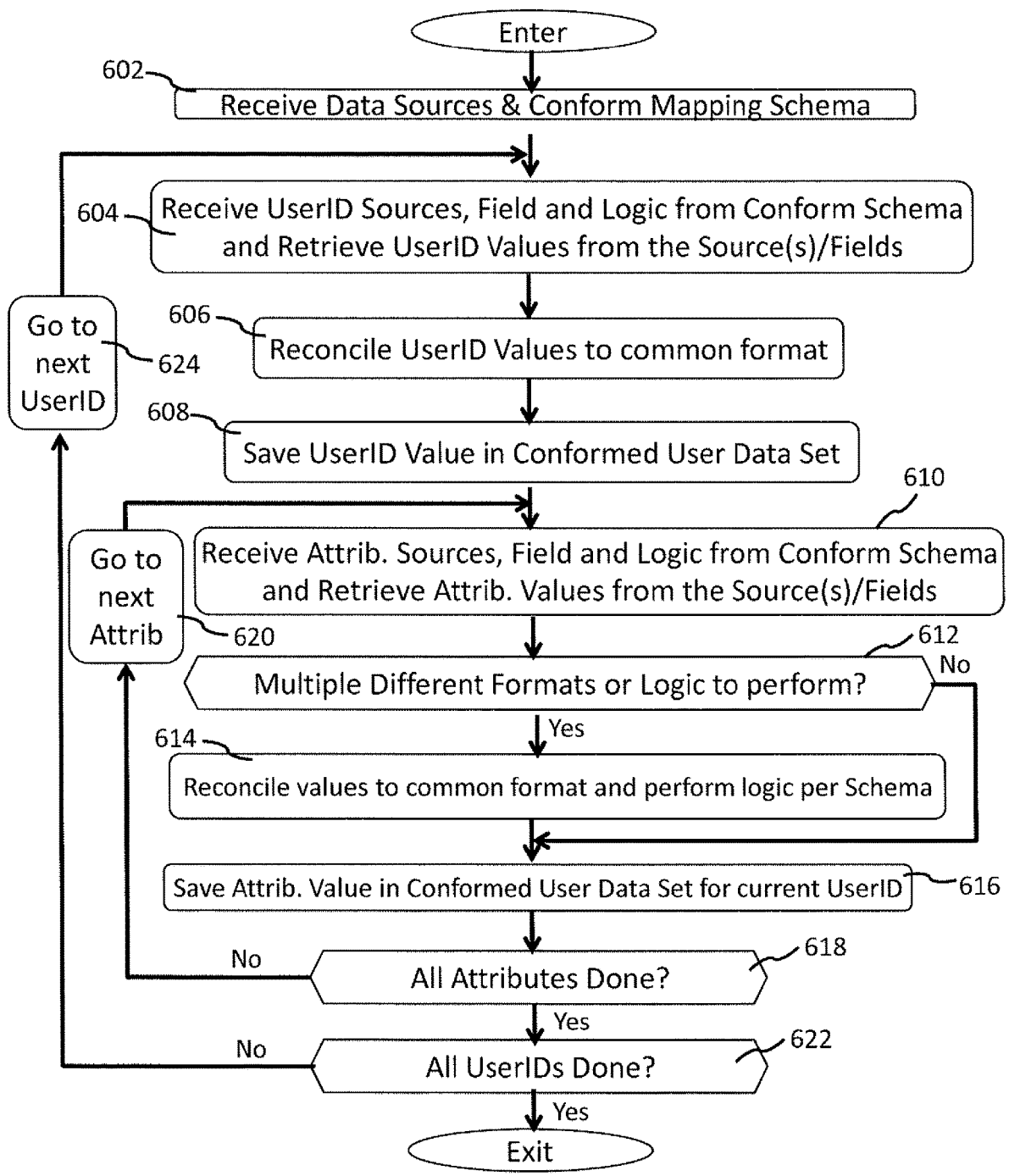

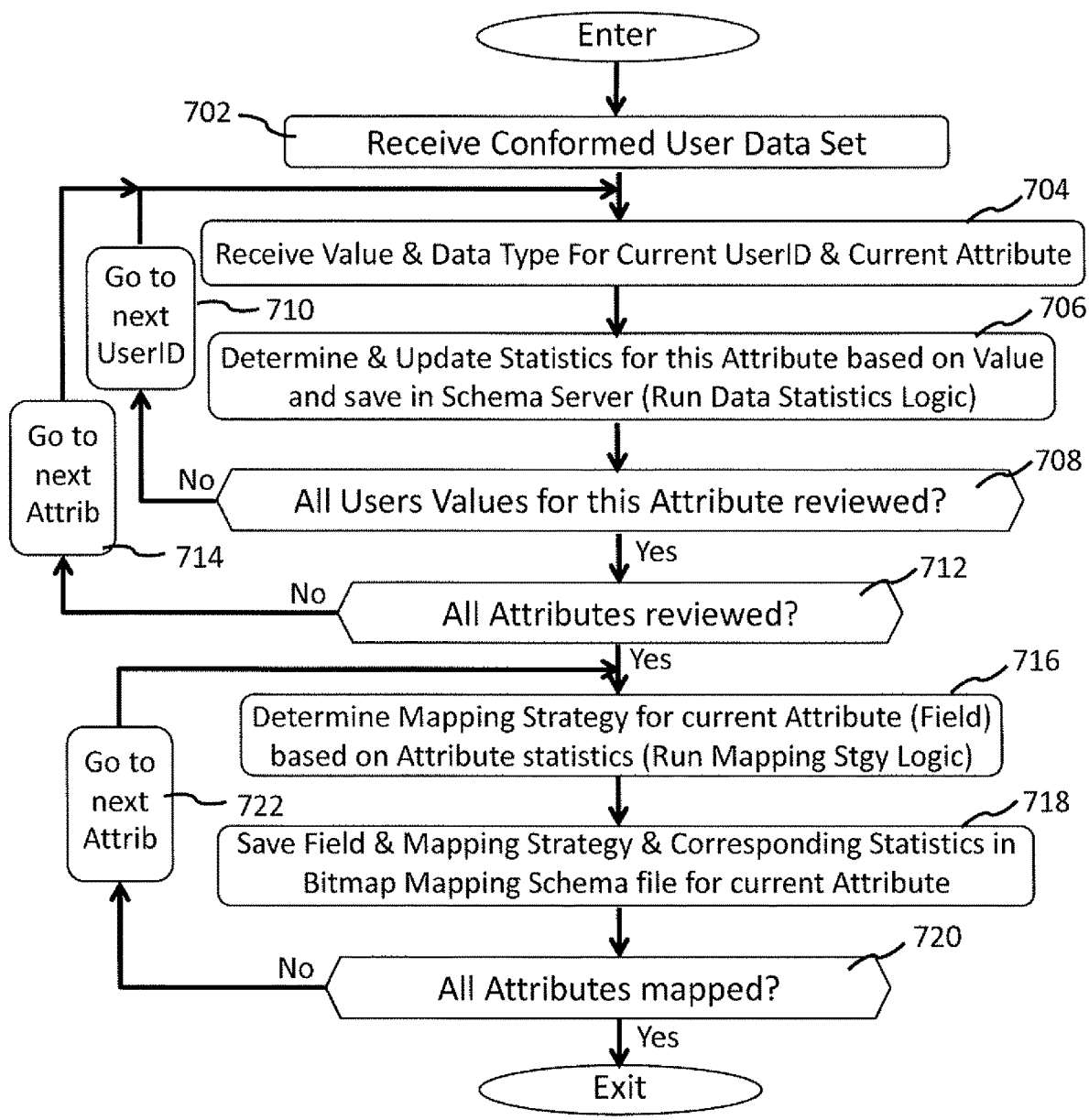

Analyzer - Data Statistics Logic

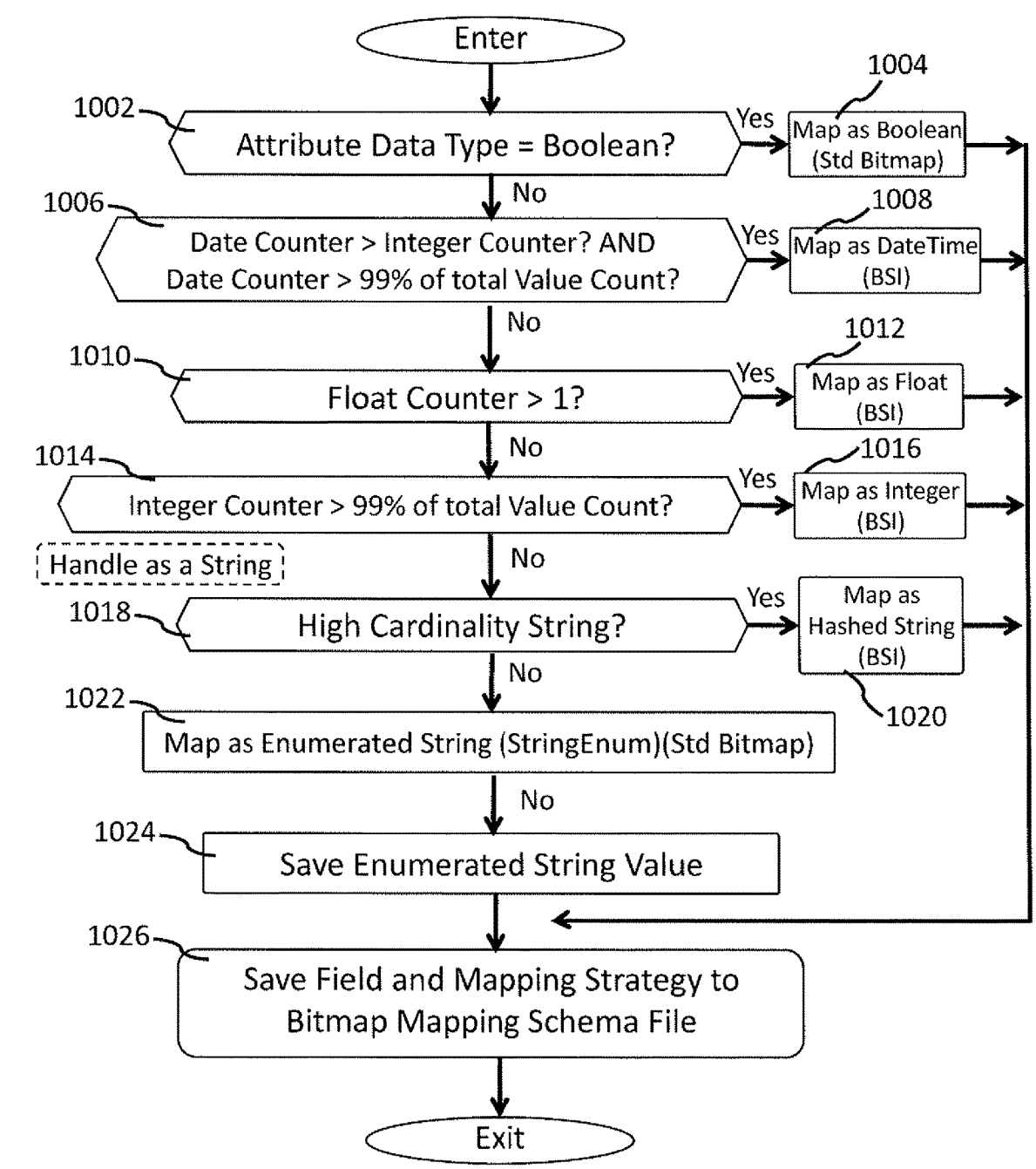

Fig. 11    Bitmap Mapping Schema

| Source Name (Attr. in Conf. Data Set) | Source Type | Field Name | Mapping Strategy | Fraction Length | Min Value | Max Value | Max Char Length | Values | RowIDs |
|---|---|---|---|---|---|---|---|---|---|
| User_ID | String | User_ID | StringHashBSI | | | 4294967295 | 69 | | 1,2,3 |
| gender | String | gender | StringEnum | | | | 1 | M,F,U | 1-M |
| age | Integer | age | IntDirect | | | 167 | | | |
| Browser | String | Browser | StringEnum | | | | | Name1-NameM1 | 1 - M1 |
| plays_fantasy | Boolean | plays_fantasy | BoolDirect | | | | | | 1 |
| Device_ID | Integer | Device_ID | IntBSI | | | 20,000,000 | | | |
| Device_Category | String | Device_Category | StringEnum | | | | 10 | Cat1-CatM2 | 1 - M2 |
| Device_Manuf | String | Device_Manuf | StringEnum | | | | 25 | Manf1-ManfM3 | 1 - M3 |
| Location_State | String | Location_State | StringEnum | | | | 30 | state1-stateM4 | 1 - M4 |
| Location_City | String | Location_City | StringEnum | | | | 35 | city1-cityM5 | 1 - M5 |
| latitude | Float | latitude | FloatScaleBSI | 6 | -2147483648 | 2147483647 | | | |
| longitude | Float | longitude | FloatScaleBSI | 6 | -2147483648 | 2147483647 | | | |
| St_Tm_Fav_TeamID | Integer | St_Tm_Fav_TeamID | IntBSI | | | 1,000 | | | |
| St_Tm_Fav_Name | String | St_Tm_Fav_Name | StringEnum | | | | 25 | Name1-NameM6 | 1 - M6 |
| St_Sp_Fav_SportID | Integer | St_Sp_Fav_SportID | IntBSI | | | 100 | | | |
| St_Sp_Fav_Sport | String | St_Sp_Fav_Sport | StringEnum | | | | 25 | sport1-sportM7 | 1 - M7 |
| ContAct-Source | String | ContAct-Source | StringEnum | | | | 25 | source1-sourceM8 | 1 - M8 |
| ContAct-DateTime | String | ContAct-DateTime | DateBSI | | | | | | |
| ContAct-Device | String | ContAct-Device | StringEnum | | | 10,000 | 25 | CAdev1-CAdevM9 | 1 - M9 |
| ContAct-Content_Type | String | ContAct-Content_Type | StringEnum | | | | 10 | type1-typeM10 | 1 - M10 |
| ContAct-Video_Title | String | ContAct-Video_Title | StringHash | | | | | Vtitle1-VtitleM11 | 1 - M11 |
| ContAct-Audio_Title | String | ContAct-Audio_Title | StringHash | | | | | Atitle1-AtitleM12 | 1 - M12 |
| ContAct-Story_Title | String | ContAct-Story_Title | StringHash | | | | | Stitle1-StitleM13 | 1 - M13 |
| ContAct-Video_Duration | Integer | ContAct-Video_Duration | IntBSI | | | 600 | | | |
| AdsAct-Source | String | AdsAct-Source | StringEnum | | | | 25 | Asrce1-AsreM14 | 1 - M14 |
| AdsAct-DateTime | String | AdsAct-DateTime | Date | | | | | | |
| AdsAct-Device | String | AdsAct-Device | StringEnum | | | | | AAdev1-AAdevM15 | 1 - M15 |
| AdsAct-AdvName | String | AdsAct-AdvName | StringEnum | | | | | AAnm1-AAnmM16 | 1 - M16 |
| registered_dma_id | Integer | dma_id | IntDirect | | | | | dma1-dmaM17 | 1-M17 |
| registration_source | String | registration_source | StringHashBSI | | | 4294967295 | 69 | | |

Loader Logic

Fig. 14A
Bitmap Index Table Sample

220

| Field Name (Mapped Format) | Row Name (y) (Values) | Row ID | Column ID (Users) (x) | | | | |
|---|---|---|---|---|---|---|---|
| | | | 1 | 2 | 3 | ... | N |
| | | | User1 ID | User2 ID | User3 ID | ... | UserN ID |
| Gender (StringEnum) | Male (M) | 1 | 1 | 0 | 0 | ... | 1 |
| | Female (F) | 2 | 0 | 1 | 0 | ... | 0 |
| | Unknown (U) | 3 | 0 | 0 | 1 | ... | 0 |
| Age (IntDirect) | 19 | 1 | 0 | 0 | 1 | ... | 0 |
| | 22 | 2 | 1 | 0 | 0 | ... | 0 |
| | 31 | 3 | 0 | 1 | 0 | ... | 0 |
| | ...(other ages) | ... | ... | ... | ... | ... | ... |
| | Unknown (199) | M | 0 | 0 | 0 | ... | 1 |
| Browser (StringEnum) | Inet Expl. (1) | 1 | 0 | 1 | 0 | ... | 0 |
| | Chrome (2) | 2 | 1 | 0 | 0 | ... | 1 |
| | Safari (5) | 3 | 0 | 0 | 1 | ... | 0 |
| | Opera (8) | 4 | 0 | 0 | 0 | ... | 0 |
| | ...(other browers) | ... | ... | ... | ... | ... | ... |
| Plays_Fantasy (Boolean) | True/False | 1 | 1 | 1 | 0 | ... | 1 |
| Location_State (StringEnum) | NY (10) | 1 | 0 | 0 | 0 | ... | 1 |
| | MA (16) | 2 | 0 | 1 | 1 | ... | 0 |
| | NH (23) | 3 | 0 | 0 | 0 | ... | 0 |
| | FL (34) | 4 | 1 | 0 | 0 | ... | 0 |
| | ...(other states) | ... | ... | ... | ... | ... | ... |
| Location_City (StringEnum) | NYC (3) | 1 | 0 | 0 | 0 | ... | 1 |
| | Chicago (5) | 2 | 0 | 0 | 1 | ... | 0 |
| | Boston (7) | 3 | 0 | 1 | 0 | ... | 0 |
| | Miami (59) | 4 | 1 | 0 | 0 | ... | 0 |
| | ...(other cities) | ... | ... | ... | ... | ... | ... |
| Other Location Fields/Attributes | ...(other Loc Attrib) | ... | ... | ... | ... | ... | ... |
| St_Tm_Fav_Name (StringEnum) | Patriots (11) | 1 | 0 | 1 | 0 | ... | 0 |
| | Cowboys (23) | 2 | 0 | 0 | 0 | ... | 0 |
| | Giants (31) | 3 | 0 | 0 | 1 | ... | 1 |
| | Miami Heat (122) | 4 | 1 | 0 | 0 | ... | 0 |
| | ...(other names) | ... | ... | ... | ... | ... | ... |
| St_Sp_Fav_Sport (StringEnum) | Football (1) | 1 | 0 | 1 | 0 | ... | 1 |
| | Baseball (2) | 2 | 0 | 0 | 0 | ... | 0 |
| | Basketball (3) | 3 | 1 | 0 | 0 | ... | 0 |
| | Hockey (4) | 4 | 0 | 0 | 1 | ... | 0 |
| | ...(other sports) | ... | ... | ... | ... | ... | ... |

Fig. 14B
Bitmap Index Table Sample

220

| Field Name (Mapped Format) | Row Name (y) (Values) | Row ID | Column ID (Users) (x) | | | | |
|---|---|---|---|---|---|---|---|
| | | | 1 | 2 | 3 | ... | N |
| | | | User1 ID | User2 ID | User3 ID | ... | UserN ID |
| ContAct-Source (StringEnum) | ESPN.com (1) | 1 | 1 | 0 | 1 | ... | 0 |
| | Fantasy site (3) | 2 | 0 | 1 | 0 | ... | 1 |
| | Podcast site (7) | 3 | 0 | 0 | 0 | ... | 0 |
| | Payperview (11) | 4 | 0 | 0 | 0 | ... | 0 |
| | ... (other sources) | ... | ... | ... | ... | ... | ... |
| ContAct-Video_Title (StringHash) | Title 1 (13542) | 1 | 1 | 0 | 1 | ... | 0 |
| | Title 2 (14982) | 2 | 0 | 1 | 0 | ... | 0 |
| | Title 3 (12093) | 3 | 0 | 0 | 0 | ... | 1 |
| | Title 4 (10245) | 4 | 0 | 0 | 0 | ... | 0 |
| | ... (other titles) | ... | ... | ... | ... | ... | ... |
| ContAct-Device (StringEnum) | Device 1 (5) | 1 | 1 | 0 | 0 | ... | 1 |
| | Device 2 (19) | 2 | 0 | 0 | 0 | ... | 0 |
| | Device 3 (22) | 3 | 0 | 1 | 0 | ... | 0 |
| | Device 4 (25) | 4 | 0 | 0 | 1 | ... | 0 |
| | ... (other devices) | ... | ... | ... | ... | ... | ... |
| Other ContAct Fields/Attributes | ... (other ContActs) | ... | ... | ... | ... | ... | ... |
| AdsAct-Source (StringEnum) | ESPN.com (1) | 1 | 1 | 0 | 0 | ... | 0 |
| | Fantasy site (3) | 2 | 0 | 1 | 0 | ... | 1 |
| | Podcast site (7) | 3 | 0 | 0 | 1 | ... | 0 |
| | Payperview (11) | 4 | 0 | 0 | 1 | ... | 0 |
| | ... (other sources) | ... | ... | ... | ... | ... | ... |
| AdAct-AdvName (StringEnum) | Bud (2) | 1 | 0 | 1 | 0 | ... | 0 |
| | Honda (53) | 2 | 1 | 0 | 1 | ... | 0 |
| | Nike (122) | 3 | 0 | 0 | 0 | ... | 1 |
| | Netflix (287) | 4 | 0 | 0 | 0 | ... | 0 |
| | ... (other titles) | ... | ... | ... | ... | ... | ... |
| AdsAct-Device (StringEnum) | Device 1 (5) | 1 | 0 | 1 | 0 | ... | 0 |
| | Device 2 (19) | 2 | 1 | 0 | 0 | ... | 1 |
| | Device 3 (22) | 3 | 0 | 0 | 1 | ... | 0 |
| | Device 4 (25) | 4 | 0 | 0 | 0 | ... | 0 |
| | ... (other devices) | ... | ... | ... | ... | ... | ... |
| Other AdsActs Fields/Attributes | ... (other AdsActs) | ... | ... | ... | ... | ... | ... |

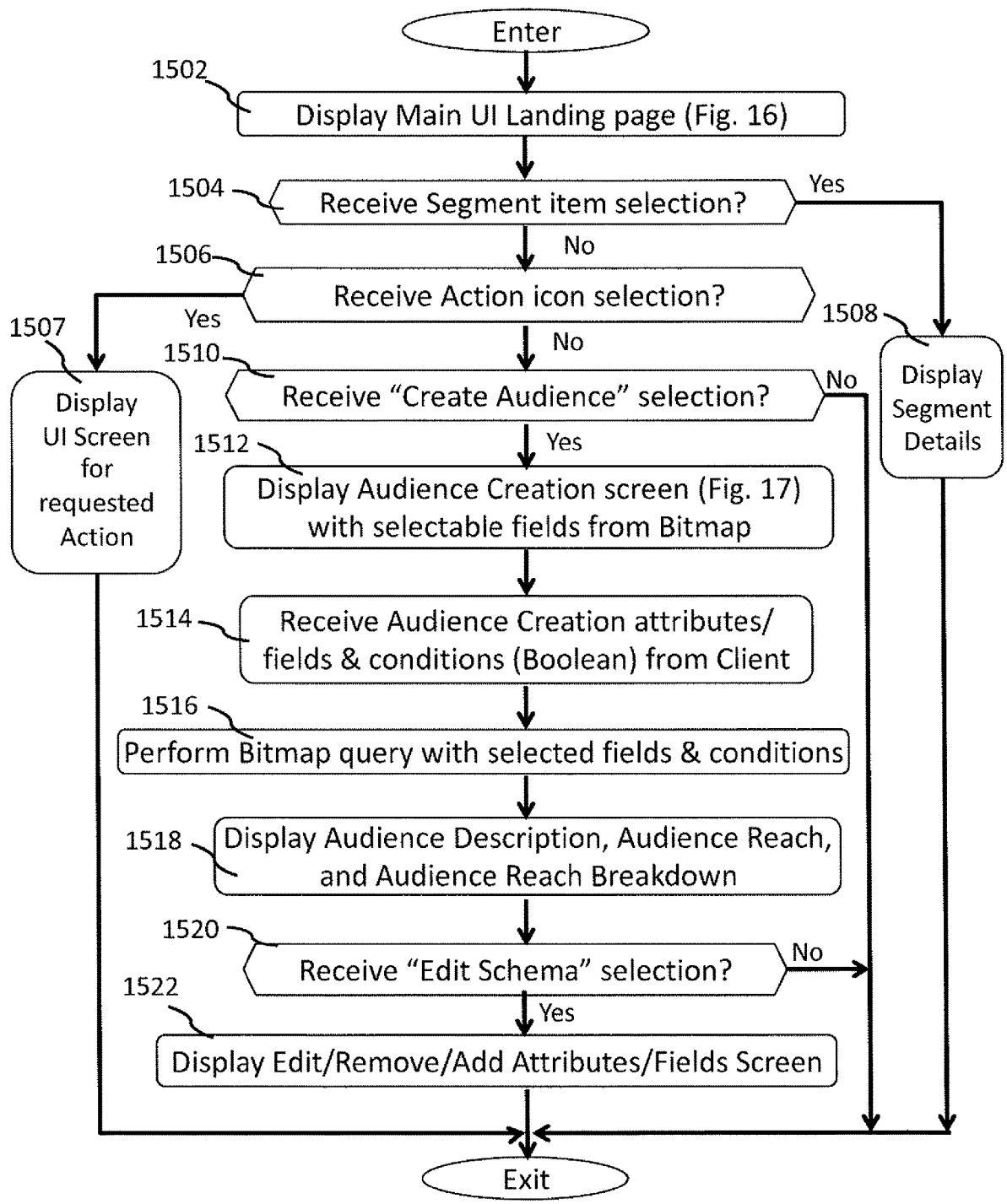

SYSTEM AND METHOD FOR CONVERTING USER DATA FROM DISPARATE SOURCES TO BITMAP DATA

BACKGROUND

Large and complex data management systems manage large quantities of data stored in many disparate data sources, such that querying and returning results from such systems in an efficient time frame is not possible. If such systems were faster or more efficient, they could be used to efficiently perform tasks such as determining potential audiences for targeted services or advertising. It is desirable to quickly obtain a complete picture (or view) of a user's preferences and behaviors/activities across multiple products (or applications) and platforms. However, this is difficult because users interact with numerous different products and platforms, each of which collects and generates information about the users in different formats and often saves them in different servers or data sources.

Also, querying user data for millions of users can take a long time to provide the query results, e.g., 30 min. to 10+ hours, depending on the search criteria, given the enormous amount of data (e.g., over 1 terabyte per day) that must be searched.

Accordingly, it would be desirable to have a method and system that provides very fast query results of a large quantity of user data which includes user data across multiple products and platforms.

BRIEF DESCRIPTION OF THE DRAWINGS

FIG. 2A is a flow diagram of one embodiment of one of the components in FIG. 2, in accordance with embodiments of the present disclosure.

FIG. 4 is a table showing a sample listing for the Conform Mapping Schema, in accordance with embodiments of the present disclosure.

FIG. 5 is a table showing a sample listing for the Conform User Data Set for a plurality of users, in accordance with embodiments of the present disclosure.

FIG. 6 is a flow diagram of one embodiment of Conforming Logic, in accordance with embodiments of the present disclosure.

FIG. 7 is a flow diagram of one embodiment of Analyzer Logic, in accordance with embodiments of the present disclosure.

FIG. 9A is table showing a sample listing for the String Enumeration Map/Table for three different attributes, in accordance with embodiments of the present disclosure.

FIG. 9B is a table showing a sample listing for a data Type counter for each attribute, in accordance with embodiments of the present disclosure.

FIG. 10 is a flow diagram of another portion of Analyzer Logic of FIG. 7, in accordance with embodiments of the present disclosure.

FIG. 11 is a table showing a sample listing for the Bitmap Mapping Schema, in accordance with embodiments of the present disclosure.

FIG. 14A is a table showing a sample listing for the Bitmap Index User Data Set, in accordance with embodiments of the present disclosure.

FIG. 14B is a table showing a further sample listing for the Bitmap Index User Data Set continued from FIG. 14A, in accordance with embodiments of the present disclosure.

FIG. 15 is a flow diagram of one embodiment of Query UI App logic, in accordance with embodiments of the present disclosure.

DETAILED DESCRIPTION

Figure 1:
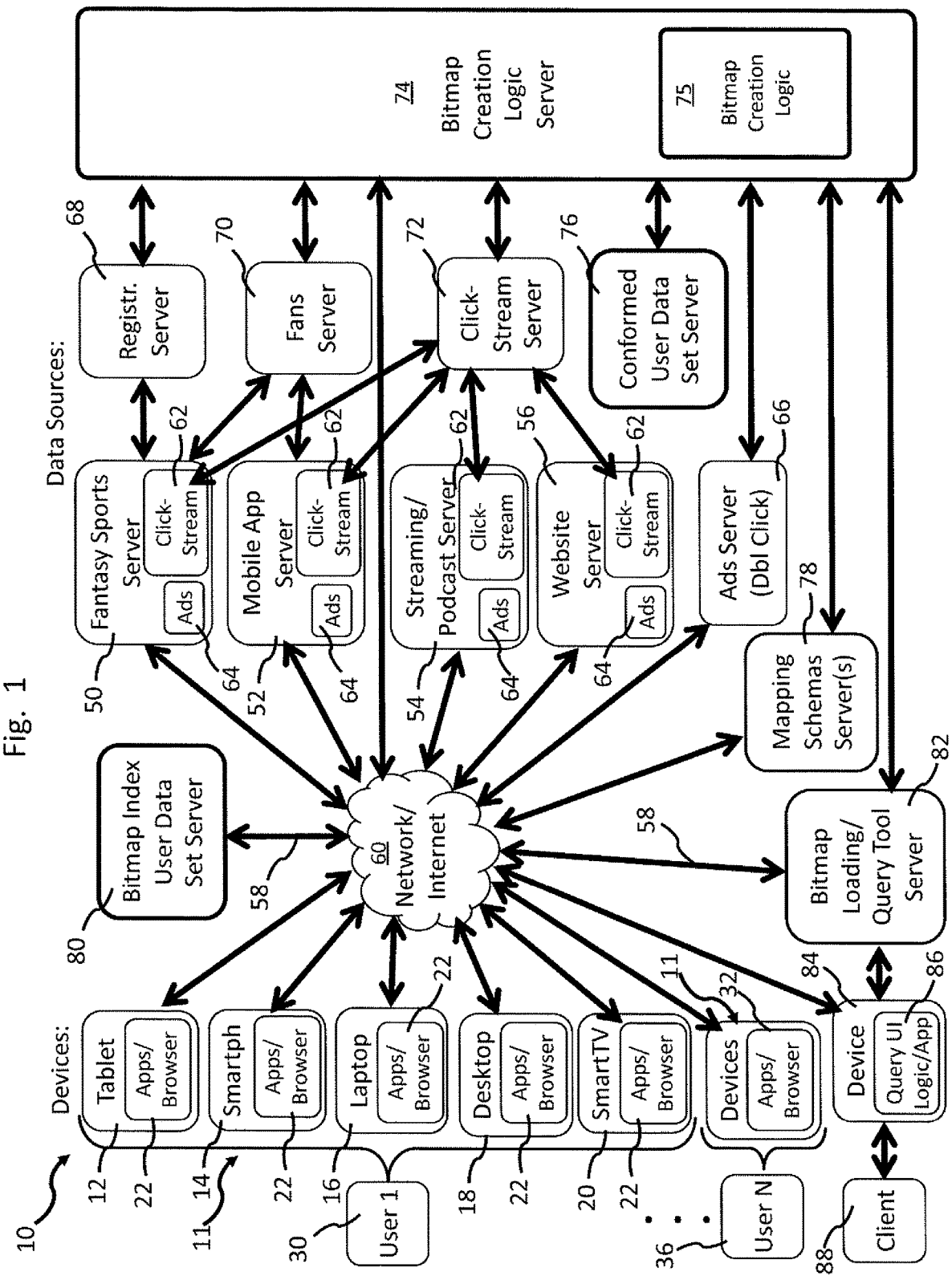
FIG. 1 is a top-level block diagram of components of a system for converting user data into bitmap data, in accordance with embodiments of the present disclosure.

As discussed in more detail below, in some embodiments, the present disclosure is directed to methods and systems for converting user (or guest) data from disparate sources and formats to bitmap data, which is easily and quickly searchable, e.g., less than about 5 seconds for all queries, and typically about 2 seconds (on average). In some embodiments, the number of users is greater than 1 million, greater than 10 million, or greater than 100 million users.

In some embodiments, instead of or in addition to the data being associated with (or related to or indicative of) users (or guests or individuals/people), the data may be associated with any items having a plurality of attributes or characteristics desired to be searched/queried, such as machines or equipment, cars/vehicles/aircraft, real estate/property, chemical compounds, drugs, diseases, transportation systems, or any other collection of items having attributes desired to be efficiently searched/queried. In some embodiments, the term "user" herein may include such items.

The present disclosure converts user data from multiple disparate platform sources to a single conformed (or normalized) format, and converts the conformed data into bitmap data. In particular, user data is obtained from various disparate data sources and formats and converted to a "conformed" (or normalized) user data set in a conformed user data set server by Conforming Logic, which uses a Conform Mapping Schema, to provide key predetermined search attributes (or child or sub-attributes) having a common or "conformed" user data set format or "structure".

The "conformed" user data set (having the latest conformed user data) is then converted into a quickly-searchable bitmap format by Loader Logic, which uses a Bitmap Mapping Schema to create (or populate) an output bitmap index file having a predetermined bitmap structure, e.g., Roaring bitmap, using a bitmap creation/query software, e.g., Pilosa (an open source version of Roaring), the bitmap having the latest actual user data from the conformed user data set in a bitmap format. Instead of Pilosa, other implementations of the Roaring bitmap structure may be used if desired, and other bitmap structures other than Roaring may be used if desired. The present disclosure can take any input data or any data set (or sets) and represent it in the Roaring structure/system by creating the Bitmap Mapping Schema discussed herein.

The Bitmap format may be a standard bitmap data in a standard X,Y integer bit map representation or Bit-Sliced Indexed (BSI) Bitmap format, or any other Bitmap format, or a combination thereof. Other bitmap representations may be used if desired provided they provide acceptable function and performance.

The Bitmap Mapping Schema (used by the Loader Logic to create the bitmap) is created by Analyzer Logic which receives (or reads) the conformed user data set and creates the bitmap mapping schema (or mapper library), which enables the creation of the output bitmap index (or table or database) for the conformed user data set (using the Loader Logic and bitmap creation/query software). In addition, the Analyzer logic can generate a bitmap mapping schema for any type of bitmap index or structure.

The present disclosure allows for much faster searching time than if the data was not converted to bitmap format, and allows for many different types of data to be linked and converted to bitmap format which is more efficient for searching/queries.

The present disclosure provides a system and method to normalize (or conform) the data from different sources and formats and convert the conformed data to a format that is capable of being searched extremely quickly, given the enormous amount of data (e.g., over 1 terabyte per day) that must be searched. Also, the users have multiple touchpoints with the system, e.g., desktop, apps, tablet, connected TV, and the like, and the collected data from these touchpoints are kept in independent servers or pockets. Also, there is a significant amount of duplicated data and each data set comes with information about a different set of users. The system of the present disclosure takes the data from different servers and different users and converts it to bitmaps capable of being searched very fast in real time. Thus, the system of the present disclosure provides a comprehensive, easy to use system capable of extremely fast searches on large volumes of disparate data.

FIG. 1 illustrates various components of a system 10 for converting user data into bitmap data of the present disclosure, which includes a plurality of users (or guests), e.g., User 1 (30) to User N (36), which may be referred to generally herein as the user 30 or users 30, each user 30 interacting with one or more computer-based user devices 11, such as a tablet 12, smartphone 14, laptop 16, desktop 18, smart TV 20, and other devices/sources, and one or more similar devices 11 associated with UserN.

The user devices 11, may be connected to or communicate with each other and other devices and servers in the system (discussed herein), through a communications network 60, such as a local area network (LAN), wide area network (WAN), virtual private network (VPN), peer-to-peer network, or the internet, wired or wireless, as indicated by lines 58, by sending and receiving digital data over the communications network 60. If the user devices 11 are connected via a local or private or secured network, the user devices 11 may have a separate network connection to the internet for use by web browsers running on the user devices 11.

In some embodiments, the user devices 11 may each have the appropriate software applications (Apps) and web browsers 22 to connect to or communicate with the internet/network 60 to obtain desired content in a standard client-server based configuration to obtain the needed data and files to execute the logic of the present disclosure. The user devices 11 may also have local digital storage located in the device itself (or connected directly thereto, such as an external USB connected hard drive, thumb drive or the like) for storing data, images, audio/video, documents, and the like, which may be accessed by the App/Browser 22 running on the user devices 11.

Also, the computer-based user devices 11 may also communicate with various computer servers 50-56 via the network 60 to run various apps or access webpages or save data associated with same, e.g., Fantasy Sports Server 50, Mobile App Server 52, Streaming/Podcast Server 54, Website Server 56, which host the various platforms that the Users 30 interact with.

In addition, there may be data source servers 66-76, e.g., registration server 68, Fans Server 70 (or Fans Engagement Server), Clickstream Server 72, Ads Server 66, which track various user activity and store user data associated with the Users interaction with the various platforms, products and applications. Also, each of the servers 50-56 may have user "click-monitoring" software application or module 62 running thereon, which monitors the user clicks or interactions, e.g., Adobe® Clickstream, and collects data regarding user clicks on content links, e.g., links for article/stories, videos, audio sound-track/podcast, websites, or other content-related clickable links, including tracking multiple levels of clicks or click-throughs or navigation clicks through numerous web pages.

The data from the Clickstream App 62 from each of the product or platform servers 50-56 provide a real-time user activity data set to a Clickstream Server 72 having a pre-defined data format defined by the Clickstream product.

Also, each of the servers 50-56 may have an "Ads-monitoring" software application or module 64 which monitors the advertisements that are provided (or "served") to the user during a user's interaction with the platforms, products and applications, e.g., Google® DoubleClick Platform, and collects data regarding user clicks on the advertisement links or images and provides data and statistics on advertisement "impressions", which can be used to determine value for advertisers.

The data from the Ads-monitoring App/module 64 from each of the product or platform servers 50-56, provide a real-time user activity data set to an Ads Server 66 having a predefined data format defined by the DoubleClick product or platform. In some embodiments, the Ads app/module may indicate that an ad has been served and the Ads Server software monitors the user activity to determine click-throughs or ad-response clicks by the users.

Also, there may be a Registration Server 68, which receives user registration data from any of the products or platforms, e.g., Fantasy Sports Server 50, which collect such data. For example, if User 1 (30) registered for Fantasy Sports team, the Registration Server 68 would collect the data associated with whether a user is registered for (or plays) a Fantasy game. The data stored in Registration Server 68, provides a real-time user activity data set regarding user registration data having a predefined data format and labels or attributes or fields defined by the registration server software which may be resident in the Registration Server 68.

Similarly, there may be a Fans Server 70 (or Fans Engagement Server), which receives user sports fan-related data from any of the products or platforms, e.g., Fantasy Sports Server 50, ESPN Sports Mobile App Server 52, which collect such data. For example, if User 1 (30) answered questions in his profile regarding favorite team(s) or favorite sports(s), the Fans Server 70 would collect the data associated with what teams or sports the user is has indicated are his favorites or are interested in following. This server may also track and save information about what fantasy teams the user plays on, what sports the users plays, and what players the user follows or plays in fantasy leagues. The data stored in the Fans Server 70, provides a real-time user activity data set regarding user sports fans data having a predefined data format and labels or attributes or fields defined by the Fans Server software, which may be resident on the Fans Server 70.

Accordingly, the servers 66-72, may be referred to herein as "data source" servers 66-74. Any other or additional data source servers that provide data or information about the user that may be used for queries or searches may be used if desired.

The present disclosure receives data from the data source servers 66-72, which each may have their own unique data formats and labels/fields/attributes for the same information/data and converts them into a bitmap data set in bitmap format using Bitmap Creation (or Generation) Logic 75 (discussed hereafter) stored on a Bitmap Creation Logic Server 74. The Bitmap Creation Logic 75 creates a "conformed" (or normalized) user data set (discussed hereafter), which is stored on a Conformed Data Set Server 76 using a Conform Mapping Schema (discussed hereinafter) stored on a Mapping Schema Server 78. Then, the Bitmap Creation Logic 75 receives the conformed data set and converts it into a quickly-searchable "bitmap" format, using a Bitmap Mapping Schema stored on the Mapping Schema Server 78 to create (or populate) the Bitmap Index User Data Set file (discussed hereinafter), which is stored on a Bitmap Index User Data Set Server 80, together with the use of a Bitmap Loading/Query Tool 214 which may be stored on a Bitmap Loading/Query tool Server 82.

A client 88 may run queries on the bitmap index user data set stored on the bitmap index user data set server 80 using a Bitmap loading/query tool via a computer 84 having the appropriate software applications Query UI App 86 and web browser (as needed) to connect to or communicate with the Bitmap Loading/Query Tool Server 82 as needed to provide the desired queries and results.

The servers shown in FIG. 1 may be any type of computer server with the necessary software or hardware (including storage capability) for performing the functions described herein. Also, the data source servers 66,68,70,72 (or the functions performed thereby) may be located, individually or collectively, in a separate server on the network 60, or may be located, in whole or in part, within one (or more) of the product or platform servers 50-56 on the network 60. Also, the data source servers 66,68,70,72 (or the functions performed thereby) may be located, individually or collectively, in a separate server on the network 60, or may be located, in whole or in part, within one (or more) servers on the network 60.

Figure 2:
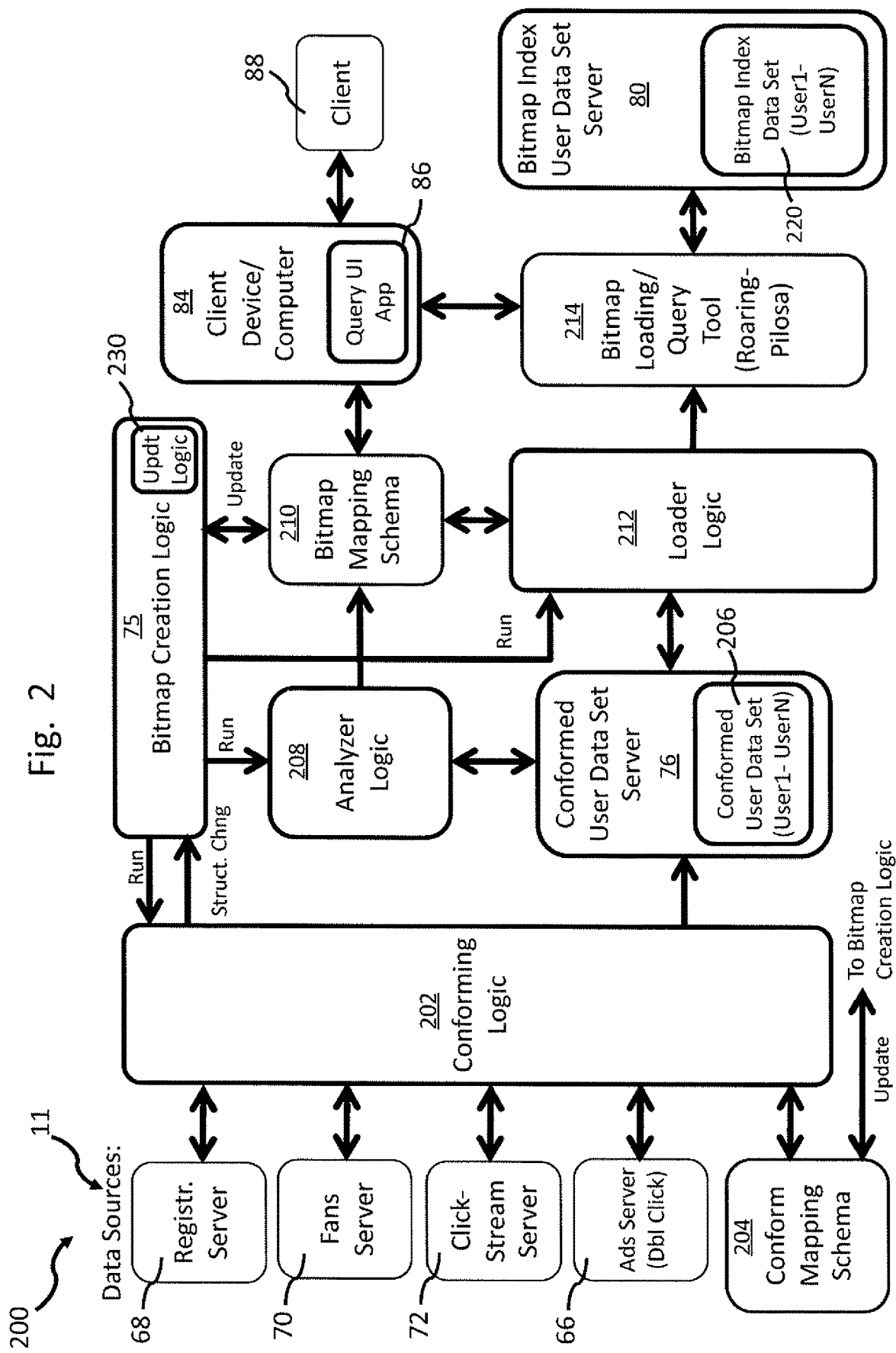
FIG. 2 is a data flow detailed block diagram of components of FIG. 1, in accordance with embodiments of the present disclosure.

Referring to FIG. 2, various components (or devices or logic) 200 for converting user data from disparate sources into bitmap data of the present disclosure, includes the Bitmap Creation Logic 75, which may be viewed as having (or calling) three main components: Conforming Logic 202, Analyzer Logic 208, and Loader Logic 212. The Conforming Logic 202 receives user data from the disparate data sources 66,68,70,72 (having different data formats) and converts the data to a "conformed" (or normalized) user data set 206 on the Conformed User Data Set Server 76, using a Conform (or Normalizer) Mapping Schema 204 stored on the Mapping Schema Server 78, to provide a common or "conformed" user data set format or "structure", having desired "attributes" (e.g., top-level or parent attributes, and child or sub-attributes) and corresponding common or "conformed" data types (e.g., string, integer, Boolean, etc.), referred to as a Conformed User Data Set 206. The attributes in the Conform Mapping Schema are typically chosen based on what data is likely to want to be searched by the client 88 (FIG. 1).

The Analyzer Logic 208 receives (or reads) the Conformed User Data Set 206 and creates a Bitmap Mapping Schema 210 (or mapper library) stored on the Mapping Schema Server 78 (FIG. 1), which is used by the Loader Logic 212 to create (or populate) the bitmap index file having a predetermined bitmap structure including data fields and data mapping strategies defined in the Bitmap Mapping Schema 210. In particular, the Analyzer Logic 208 determines fields and statistics (or metadata or data about the user data) for actual data values for all users for each of the attributes in the Conformed User Data Set 206 and creates "mapping strategies" needed to map the user data into bitmap format, which are stored in a Bitmap Mapping Schema. The Analyzer Logic 208 can generate the Bitmap Mapping Schema 210 for any type of bitmap index or structure (discussed more hereinafter). The Analyzer Logic 208 may only need to be run (or executed) when creating the initial Bitmap Mapping Schema 210 and when the data structure of the Conformed User Data Set 206 has changed, e.g., when a user data attribute or sub-attribute is added or removed from the conformed user data set 206. For example, this may happen when the Client 88 updates the desired search attributes in the Conform Mapping Schema, such as when a new sports team is added to a league or a new web browser or user device is available on the market.

As discussed more herein, the Analyzer Logic 208 analyzes the conformed (normalized) user data and determines the "structure" of the user data being received, and generates statistics on the data or metadata (i.e. data about this data). The metadata represents what "type" of data is contained in each attribute/field (e.g., integer, string, range index, Boolean, floating point). If the input data is already conformed (or normalized) and data types are provided, the Analyzer Logic may only do minimal conversion work to create for the Bitmap Mapping Schema. However, if the user data is not conformed (or normalized) or only partially conformed (or partially normalized), the Analyzer Logic 208 may determine what the data structure is and generates the mapping strategy (or schema) in a manner that is agnostic to (or independent of) the original data structure, so that the data set can be loaded into Roaring bitmap (Pilosa). The Analyzer Logic 208 also determines the type of bitmap data format, such as Standard (Std) Bitmap or Bit-Sliced Index (BSI) Bitmap, as discussed herein. Also, the Analyzer Logic 208 may use logic based on predetermined business rules to handle or reconcile conflicting data.

The Loader Logic 212 receives (or reads) the latest actual conformed user data from the Conformed User Data Set 206 and converts (or "maps") the conformed user data into bitmap format using the Bitmap Mapping Schema 210 and a Bitmap Loading/Query Tool 214 software, to create a Bitmap User Data Set 220 stored on the Bitmap Index User Data Set Server 80, the Bitmap Index User Data Set 220 having the latest actual conformed user data from the conformed user data set stored in a bitmap format. The Bitmap Index User Data Set 220 may have a predetermined bitmap structure, e.g., "Roaring" bitmap, which may be created using the Bitmap Loading/Query Tool 214 software, e.g., Pilosa (an open source version of Roaring). Any other software tool may be used for the logic 214 if desired, provided it provides the desired function and performance described herein. Also, any other type of bitmap format or structure other than Roaring and Pilosa may be used if desired, provided it provides the desired function and performance described herein.

If the Conform Mapping Schema 204 changes, e.g., when a user data attribute or sub-attribute is added or removed from the Conform Mapping Schema 204, the structure of the conformed user data set 206 will change accordingly by the Conforming Logic 202. In that case, a data structure change command (or flag) may be provided to the Bitmap Creation Logic 75, which will cause it to call or run (or execute) the Analyzer Logic 208, causing the Analyzer Logic 208 to update the Bitmap Mapping Schema 210. In some embodiments, the Analyzer Logic 208 may provide a Done flag indicating that the Bitmap Mapping Schema has been updated.

In some embodiments, the Conforming Logic 202 may be automatically run daily (or multiple times a day) to update the Conformed User Data Set 206 and the Analyzer Logic 208 may be automatically run once a week or once a month to ensure the Conformed Data Set structure is up to date (in addition or instead of receiving a structure change flag from the Conforming Logic 202. Other run schedules may be used if desired provided it provides user data that is acceptable for the desired searching or queries.

The Bitmap Creation Logic 75 may also have mapping correction/update logic 230, which reviews the Mapping Schemas 204,210 and corrects or updates them as appropriate.

The Bitmap Loading/Query Tool 214 may also be used to access the Bitmap Index user data set 220 which has the latest user data stored in easily searchable Bitmap format (discussed hereinafter). In that case, client device/computer 84 may have a Query UI App 86 that calls or queries the Bitmap Loading/Query Tool 214 and the Bitmap Mapping Schema 210 using predefined search strings and returns results about the user data in a predefined format that may be stored in the computer/device 84 and viewed by the client 88, or communicated to other devices or servers via the network 60 (FIG. 1) for reporting, analysis, storage or other purposes. The Query UI App 86 and the Bitmap Loading/Query Tool 214 may be combined into a single software application if desired. Also, Query UI App 86 may also allow the Client to edit/update the Conform Mapping Schema or the Bitmap Mapping Schema as needed to provide the desired function and performance.

Referring to FIG. 2A, a flow diagram 250 illustrates one embodiment of a process or logic for creating (or generating) the Bitmap Index User Data Set 220, which may be implemented using the Bitmap Creation Logic 75 (FIGS. 1 and 2). The logic 250 begins at a block 252, which obtains the latest version of the Conform Mapping Schema, based on current desired attributes. Next, a block 254 runs the Conforming Logic 202 (FIG. 6) to create or update the Conformed User Data Set (for Users1-N) 206 (FIG. 2) for each UserID using the Data Sources 11 and the Conform Mapping Schema 204.

Next, block 256 determines if this is the first time providing the Bitmap Mapping Schema or if structural changes have occurred in the Conformed User Data Set or Bitmap Mapping Schema, (i.e., if the data structure of the Conform Bitmap Schema or the resulting Conformed User Data Set has changed). In some embodiments, this may be done by checking a flag from the Conforming Logic 202, which indicates that the structure of the Conformed User Data Set 206 has changed.

If so, block 258 runs the Analyzer Logic 208 (discussed herein with FIG. 7), to create an initial or updated Bitmap Mapping Schema 210 using the latest Conformed User Data Set 206. Next, block 260 runs the Loader Logic 212 (discussed more herein with FIG. 13) which loads the latest update of the Conformed User Data Set 206 (having the most recent user data values) into the Bitmap Data Set 220 for each UserID, using the Bitmap Mapping Schema 210.

Next, block 262 reviews the Conform Mapping Schema 204 and Bitmap Mapping Schema 210 and determines if a mapping error exists or an update is needed. If so, block 264 makes the necessary correction or update to the appropriate Mapping Schema, and the logic 250 exits. In some embodiments, the blocks 262,264 may be referred to as correction/update logic which may be used to identify erroneous or incorrect mapping, or updates in attributes or attribute values and automatically correct the Bitmap Mapping Schema file or the Conform Mapping Schema file as appropriate. Such correction/update logic may use machine learning or artificial intelligence to identify mapping errors (e.g., in commonly-used fields) or identify new attributes/fields or attributes/fields values based on user activity or market availability, and may update the Bitmap Mapping Schema file or the Conform Mapping Schema file accordingly.

Other correction/update logic may be used if desired and such correction/update logic may reside in the Bitmap Creation Logic 75, the Analyzer Logic 208, the Loader Logic 212, the Query UI App 86, the Conforming Logic 202 or as standalone logic that interacts with the appropriate logics or servers described herein to create the desired function and performance. Also, in some embodiments, one or more of the Conforming Logic 202, the Analyzer Logic 208 and the Loader Logic 212, the Bitmap Loading/Query Tool 214 and the Query UI App 86, may be part of the Bitmap Creation Logic 75, if desired.

The Bitmap Creation Logic 75 (and, in particular, the Conforming Logic 202 and the Loader Logic 212) may be run on a periodic basis, e.g., weekly, daily, hourly, every minute, every second, to update the bitmap with the latest user data. Other update rates may be used if desired. Also, in some embodiments, the Conforming Logic 202 may load the latest user data into the Conformed User Data Set without specifying a data "type" (or "untyped" data), and the Analyzer Logic 208 may be used to determine the data type as part of the mapping strategy.

Figure 3:
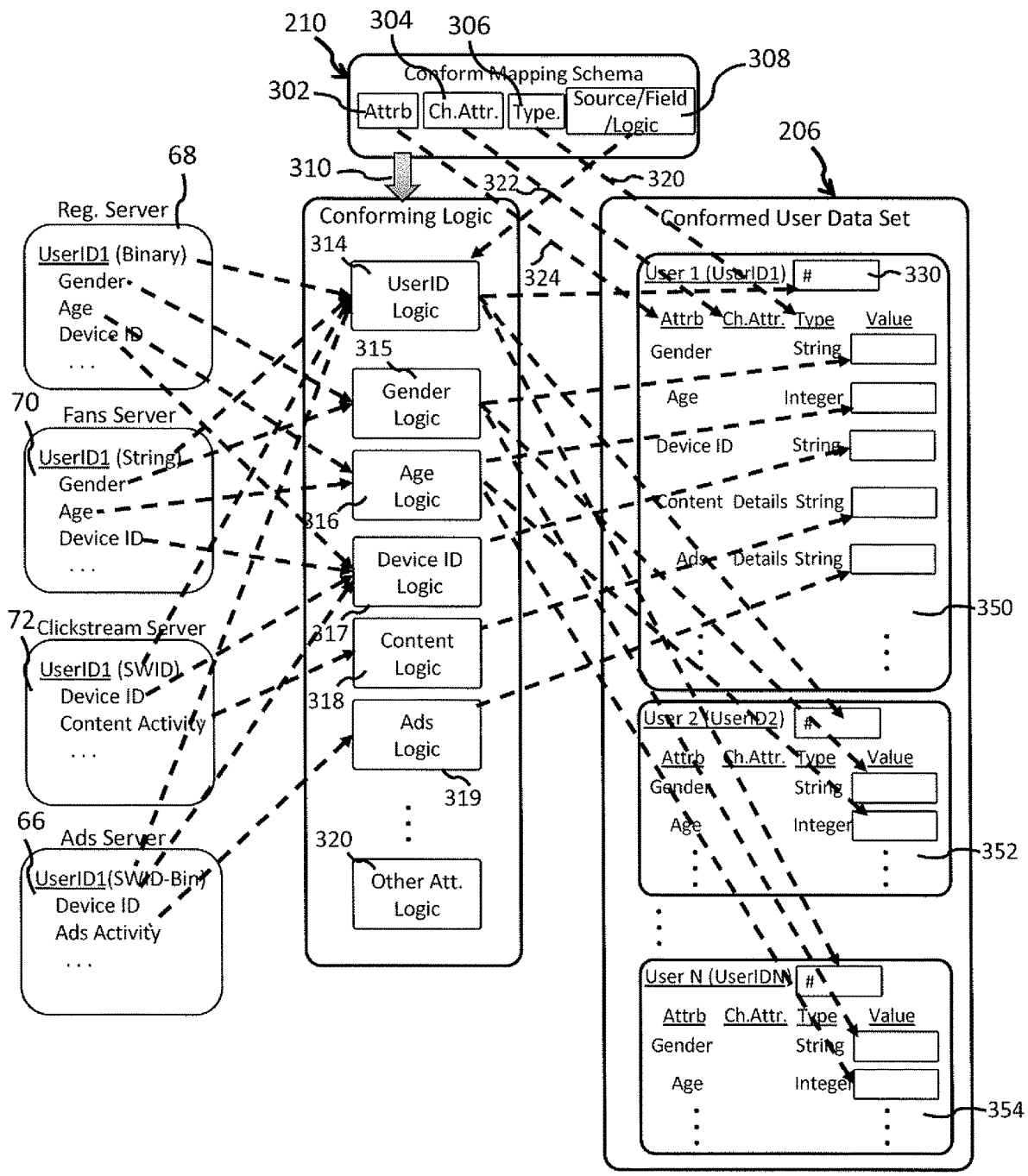
FIG. 3 is an illustration of how the Conforming Logic creates the Conformed User Data Set for each user using the Conform Mapping Schema, in accordance with embodiments of the present disclosure.

Referring to FIG. 3, an illustration is shown of how the Conforming Logic creates the Conformed User Data Set for each user (User1 to UserN) using the Conform (or Normalizer) Mapping Schema 204. In particular, the Loader Logic 212 receives (or retrieves) each Attribute 302 and Sub-Attribute 304 from the Conform Mapping Schema 210, and the source or sources (Data Source, Field, and Logic) 308 for the Attribute/Child-Attribute (or Sub-Attribute) and the desired resulting conformed data type (Type) 306, as indicated by a line 310. Also, the Conforming Logic 202 may use logic 314-320, based on predetermined business rules, to handle or reconcile conflicting data, as discussed herein.

When finished, the Conforming Logic 202 creates the Conformed User Data Set 206 having separate data sets or sections 350-354 for each of the users (User1 to UserN), having the desired attributes and sub-attributes and conformed (or normalized) data format types from the Conform Mapping Schema, and values from the various data sources whose data type format have been conformed (or reconciled or normalized) based on the conformed "Type" field in the Conform Mapping Schema 210.

For example, the "UserID1" attribute for User1 may have numerous different sources (e.g., Registration Server 68, Fans Server 70, Clickstream Server 72, and Ads Server 66) with data values having various different formats, e.g., the Registration Server format may be a binary data type, the Fans Server format may be a String type, the Clickstream may be an SWID code stored in a String type, and the Ads Server may be an SWID code stored in binary format. The Conforming Logic 202 reconciles this (shown as UserID Logic 314), e.g., as a string format, using the Conform Mapping Schema 210, to a common format indicated in the "Type" field 306 of the Conform Mapping Schema 210, which would get stored in the Conformed User Data Set 206 together with the corresponding "Attribute" and "Child Attribute" (if applicable) fields 302,304, as indicated by the lines 320,322,324, respectively. The UserID Logic 314 would also store the conformed UserID1 value in a UserID1 field 330, shown as a header for the User1 data set 350.

The present disclosure creates a centralized user lookup (or UserID) based on a standardized user identity. This provides a complete view of each user across multiple sources. In particular, each set of user data that comes into the system (from the various data sources) is associated with some form of ID or UserID. Since the data is coming from disparate sources, a single user may be represented by multiple different IDs across various products/platforms. To the extent possible, the Conforming Logic links the user data to a single, standard UserID identifying the user. In some embodiments, the present disclosure may use an "ID graph", which may be a table, database or data structure which to links various IDs to each other (along with the associated data). Also, the logic is capable of working with any type of user identity, such as a cookie, device ID, IP address, or the like. In some embodiments, for users or fans who do not sign up (or register) for any products or services, the system of the logic may use the device ID as the primary UserID.

In some embodiments, an SWID Tag (if available) may serve as the "master ID" to which other IDs are linked for a given user. SWID Tags, or SoftWare IDentification tags, are defined by the ISO/IEC 19770-2:2009 specification, published by the International Organization for Standards (ISO), and may be XML files (or other files), each of which may be associated with a specific software product. For a given SWID, the present disclosure may use the "ID graph" to determine what other ID's are known for that user. The ID graph may use probabilistic matching to associate various ID's with each other in cases where there is no direct correlation. For example, if a device ID is sent with no SWID, then the SWID for the last logged-in account for that device ID is assumed and the date is associated with that SWID. In some embodiments, when no SWID or device ID is available, or when the user is using a system or device that does not use SWIDs, the logic may use a cookie, IP address, or the like.

As another example, the user attribute "Gender" may have two different sources (Registration Server 68 and Fans Server 70) with data values having two different formats, e.g., the Registration Server format may be a three-value string data type (M=1, F=2, U=3), and the Fans Server format 312 may be a Boolean type (M=1; F=0). The Conforming Logic 202 will reconcile this (shown as Gender Logic 316) using the Conform Mapping Schema 210, as a three value string M,F,U format, which would get stored in the Conformed User Data Set 206 for that attribute.

Similarly, the user attribute "Age" may have two different sources (Registration Server 68 and Fans Server 70) with data values having two different formats, e.g., short integer and integer. The Conforming Logic 202 will reconcile this using the Conform Mapping Schema 210 (shown as Age Logic 322), e.g., as an integer format, which would get stored in the Conformed User Data Set 206 for that attribute.

Similarly, the user attribute "Device ID" may have two different sources (Registration Server 68 and Fans Server 70) with data values having two different formats, e.g., binary and string. The Conforming Logic 202 will reconcile this using the Conform Mapping Schema 210 (shown as Device ID Logic 317), e.g., as a string format, which would get stored in the Conformed User Data Set 206 for that attribute.

In some cases, the attribute may have only one data source, such as that shown for "Content Act" (or Content Activity), which indicates whether the user clicked on any content (e.g., an article, audio, video, or other content link), which is saved in the Clickstream server. In that case, there may be a Parent Attribute and Child Attributes associated with this item, as well as logic to determine information about certain parameters (e.g., Click Path of user), and the Content Logic 318, will identify the needed information from the Clickstream Server 72 (as indicated in the Conform Mapping Schema) and provide the conformed data and type to the Conformed User Data Set 206. A similar situation may exist for the Ads Act (Advertisement Activity monitor) attribute (and child attributes) on the Ads Server 66. Other logic 321 may exist for the other attributes and child attributes as needed.

Referring to FIG. 4, a sample Conform Mapping Schema table 400 is shown, including the desired Attributes 302, Child or Sub-Attributes 304, and conformed attribute data types 306 (for Attributes and Sub-Attributes). In particular, the table 400 shows Top-Level (or Parent) Attributes having no Sub-Attributes, e.g., user id, is_registered, gender, age, plays_fantasy, latitude, and longitude; and shows Second-Level (or Child or Sub) Attributes indicated as an "array" type, e.g., stated_teams_favorites, states_sports_favorites, device_id, location, content activity, ads_activity. Also included in the Conform Mapping Schema Table 400, for illustrative purposes, is a brief sample Attribute Description 402 of some of the attributes and sub-attributes, and Example Values 406 showing sample values for some of the attributes. These fields 402,410 may not be in the actual Conform Mappin Schema, but are shown here for illustrative purposes.

Referring to FIG. 5, a more detailed sample of the resulting Conformed User Data Set 206 is shown for Users1-N, including the desired top-level conformed Attributes 502 (mapped from the Attributes 302 of the Conform Mapping Schema in FIG. 4), desired Child or Sub-Attributes 504 (mapped from the Sub-Attributes 304 of the Conform Mapping Schema in FIG. 4), conformed attribute data types 506 for Attributes and Sub-Attributes (mapped from the Sub-Attributes 306 of the Conform Mapping Schema in FIG. 4), and user data Values 510. In particular, the Conformed User Data Set 220 in FIG. 5 shows Top-Level (or Parent) Attributes 502 and Second-Level (or Child or Sub) Attributes 504, a single column for data Type 506, e.g., string, integer, Boolean, float, and the like; and the user data Values 510. The Conformed User Data Set 202 may be a "flattened" data structure (e.g., a text file) consisting of a textual representation of user data which can be easily retrieved, reviewed and parsed by the Analyzer Logic 208 and Loader Logic 212 as needed. Any other data format for the Conformed User Data Set 202 may be used if desired.

Referring to FIG. 6, a flow diagram 600 illustrates one embodiment of a process or logic for creating the conformed user data set 206 (FIG. 2), which may be implemented using the Conforming Logic 202 (FIGS. 2 and 3). The logic 600 begins at a block 602, which receives the Data Sources 11 and the Conform Mapping Schema 204. Next, a block 604 receives the UserID sources, source fields to retrieve the UserID from, and Logic (as needed), from the Conform Schema and retrieve UserID values from the corresponding data Sources/Fields. Next, a block 606 reconciles the UserID values to a common format as indicated in the Conform Schema. Next, a block 608 saves the conformed UserID value in the Conformed User Data Set 206. This sets up the User ID for this user.

Next, a block 610 receives, for a given Attribute, the Attribute Sources, source Fields to retrieve the Attribute from, and Logic (as needed), from the Conform Schema 204 and retrieves Attribute values from the corresponding data Source(s)/Field(s). Then, a block 612 determines if there are multiple different data formats or logic to perform. If so, a block 614 reconciles the values to a common format and performs logic (as needed) per the Conformed Mapping Schema for that attribute. After block 614, or if the result of block 612 was NO, a block 616 saves the Attribute value in the Conformed User Data Set for the current UserID.

Next a block 618 determines if all the Attributes have been reviewed for a value. If not, a block 620 goes to the next Attribute in the list for this UserID and repeats the blocks 610-616 for the next Attribute until all the Attributes for a given UserID is completed. If the result of block 618 is Yes, all Attributes for this UserID have been updated with a value (if available), and a block 622 determines if all the UserIDs have been reviewed. If not, a block 624 goes to the next UserID and the logic returns to block 604 to obtain the next UserID. If the result of block 622 is Yes, all UserIDs have been reviewed for all of their respective attributes (if available), and the logic exits.

Referring to FIG. 7, a flow diagram 700 illustrates one embodiment of a process or logic for creating or updating (when needed) the Bitmap Mapping Schema file 210 (FIG. 2), which may be implemented using the Analyzer Logic 208 (FIGS. 2 and 3). As discussed with the Bitmap Creation Logic of FIG. 2A, the Analyzer Logic 208 may be performed after performing the Conforming Logic 202, e.g., initially and when the Conform Mapping Schema changes the structure of the Conformed User Data Set.

The Analyzer Logic 208 receives (or ingests) text or binary (or other format) data files as input data and outputs the Bitmap Mapping Schema 210. For each user in the input user data set, e.g., the Conformed User Data Set 206, the Analyzer Logic 208 determines what type of data is in each attribute/field. In cases where the data "Type" is not provided in the conformed data set 206, the Analyzer Logic 208 determines if the data type is Boolean, Integer, Floating Point, Date, or String (independent of the data format received). For numbers (integers, floating point, etc.), the determines the minimum and maximum values and number of values. For Strings, the Analyzer Logic keeps track of the length (cardinality) of Strings, the number of entries and number of different values/strings, and then generates the mapping strategy to map the user data into the bitmap format. For "date" fields, the Analyzer Logic keeps track of the number of occurrences. In general, "dates" may appear in multiple formats from various different data sources. For Roaring, the Analyzer Logic 208 converts all "dates" into 2 integers, independent of the format of the originally ingested "date" data. Such data analysis is described further with the below logic.

In particular, the logic 700 begins at a block 702, which receives the Conformed User Data Set 206. Next, a block 704 receives the value and data type for the current UserID and current Attribute, from the Conformed User Data Set 206.

Next, a block 706 determines and updates the statistics for the current Attribute based on the attribute value for this UserID and saves the result in the on the Schema Server, which may be performed by Analyzer—Data Statistics Logic 800 shown in FIG. 8 (discussed hereinafter). Next, a block 708 determines if all the UserIDs for this attribute have been reviewed. If not, block 710 goes to the next UserID and the logic returns to block 704 to obtain the value and data type. If the result of block 708 is Yes, all UserIDs have been reviewed for the current attribute, and block 712 determines if all the attributes have been reviewed. If not, a block 714 goes to the next Attribute and the logic returns to block 704 to repeat steps 704-708 until all the Attributes for a given UserID is reviewed. If the result of block 712 is Yes, all Attributes for all the UserIDs have been reviewed and block 716 determines a Mapping Strategy for current Attribute (Field) based on Attribute value statistics which may be performed by Analyzer—Mapping Strategy Logic 1000 shown in FIG. 10 (discussed hereinafter).

Next, once a mapping strategy has been determined for the Attribute, a block 718 saves the resulting "Field" name (corresponding to the source Attribute name) and corresponding Mapping Strategy and associated Metadata in the Bitmap Mapping Schema file for the current Attribute being reviewed. Next, block 720 determines if all the source Attributes have been mapped. If not, block 722 goes to the next Attribute and the logic returns to block 716 to repeat steps 716-718 until a Field and Mapping Strategy and other Metadata are assigned/determined for all the source Attributes. If the result of block 720 is Yes, a Field and Mapping Strategy and Metadata have been assigned/determined for all the source Attributes, and the Bitmap Mapping Schema 210 creation/update is complete, and the logic exits.

The resulting Bitmap Mapping Schema (and mapping strategies therein) created/updated by the Analyzer Logic 208 may be reviewed or edited/modified by the Client (e.g., a marketing person or other client) by editing the Bitmap Mapping Schema file (also referred to herein as the "config." file) or the Conform Mapping Schema file, to identify or correct erroneous or incorrect mapping, or to input updates in attributes or attribute values, e.g., using the Query UI App 86, as discussed more with FIG. 15.

In some embodiments, as discussed herein with the Bitmap Creation Logic 75 in FIG. 2A, correction/update logic (blocks 262,264) may be used to identify erroneous or incorrect mapping, or updates in attributes or attribute values and automatically correct the Bitmap Mapping Schema file or the Conform Mapping Schema file, using e.g., machine learning or artificial intelligence as discussed herein.

Figure 8:
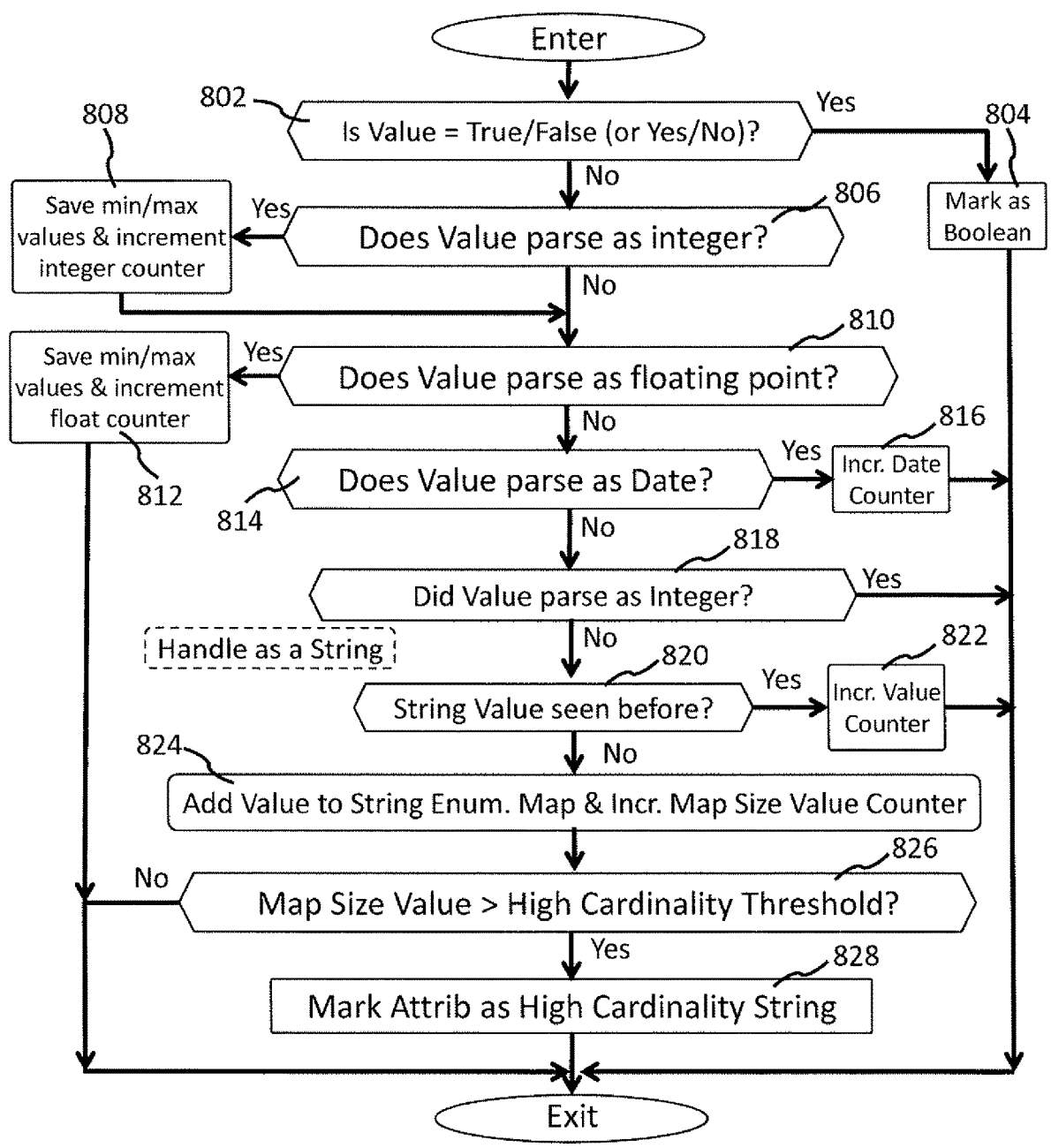
FIG. 8 is a flow diagram of a portion of Analyzer Logic of FIG. 7, in accordance with embodiments of the present disclosure.

Referring to FIG. 8, a flow diagram 800 illustrates one embodiment of a process or logic for implementing block 706 of the Analyzer Logic 208 for determining and updating statistics for source attributes values, which may be implemented using the Analyzer—Data Statistics Logic 800. The logic 800 begins at a block 802, which determines if the value of the attribute is true or false (or yes/no). If so, a block 804 marks the attribute as Boolean and the logic exits. If not, a block 806 determines if the value can be parsed as an integer. This may be done by calling a known parsing function or tool or routine in a routine library, such as "GO LANG" or "LANG", with the desired data and data type to attempt to parse, e.g., integer, float, or others, and which returns two values. If the parsing function was able to parse the value in the desired data type, e.g., integer, it returns the integer number and a true flag. If the parsing function was not able to parse the value in the desired data type, e.g., integer, it returns a 0 (or Nill) value and a false flag.

If it parses as an integer, block 808 checks if it is a min or max value so far, and if so, the min/max values are updated/saved in the metadata. Also, an integer counter is incremented in block 808. After performing block 808, or if the result of block 806 is NO, block 810 determines if the value can be parsed as a floating point number (a number with numbers on both sides of the decimal point). If so, block 812 checks if it is a min or max value so far, and if so, the min/max values are updated/saved in the metadata. Also, a float counter is incremented in block 812, and then the logic exits.

If the result of block 810 is NO, a block 814 determines if the value parses as a date. This may be done by calling a known specialized library state machine pattern-matching open source utility tool, such as "PARSE DATE", with the desired date data to attempt to parse as a Date, and which returns two values. If the parsing function was able to parse as a date, the utility returns a date format descriptor (e.g., data or date/time, based on language used), and a Y-true value or flag. If the parsing function was not able to parse the value in the desired data type, e.g., integer, it returns a 0 (or Nill) value and a false value or flag. If the result of block 810 is Yes (parsable as a date), block 816 increments a Date counter, and the logic exits.

If the result of block 814 is NO, a block 818 determines if the value parsed as an integer in block 806. If so, the logic exits as the value has already been identified as an integer. If the result of block 818 is NO, the value did not a Boolean value and did not parse as an integer or a floating point number, and, thus, the value is handled as a "string" type.

Next, block 820 determines if the string enumeration value for this string has been seen before. Block 820 may also calculate the string enumeration value for this string. If so, block 822 increments a value counter for that value and the logic 800 exits. If the result of block 820 is No, this is the first time seeing this string and block 824 adds the string to a string enumeration table and increments a map size counter for the attribute. Next, block 826 determines if map size value counter is greater than a predetermine high cardinality threshold, e.g., max. 500 values. If so, the attribute is marked as high cardinality string at block 828 and the logic 800 exits. If not, the logic 800 exists.

Referring to FIGS. 9A and 9B, an example of a string enumeration map/table 900 and a data type counter table 950 are shown, respectively. The string enumeration map/table 900 shows three example sub-tables for team name 902, browser 904, and video title 906. In the far left column of each table shows the tally of how many different values (or strings) there were (which may in some embodiments be the string enumeration value), the center column shows the string value and the right column shows the number of users that selected that string value. In some embodiments, the tables 902-906 may include a separate string enumeration column which may be a unique value or code assigned to each string value. For example, for team name, there may be a table or map that provide or assigns a unique code for each sports team, e.g., Bears=32; Wolves=10; Hawks=55; Lions=20; Tigers=130; and the like, for all sports teams in all sports. In that case, the value column may be replaced by the team code, or both columns may exist.

For the Team Name table 902, there were a total of 105 different string values (team names) selected by all the users, which is less than the High Cardinality (HC) Threshold of e.g., 500 values; thus, this string is not mapped as high cardinality (not HC), and can be mapped as a standard String Enumeration value. Similarly, for the Browser table 904, there were a total of 10 different string values (browser names), which is less than the High Cardinality (HC) Threshold of, e.g., 500 values; thus, this string is not mapped as high cardinality (not HC), and can be mapped as a standard String Enumeration value. However, for the Video Title table 906, there were a total of 2,000 different string values (video titles), which is greater than the High Cardinality (HC) Threshold of e.g., 500 values; thus, this string is mapped as High Cardinality String (HC String), and can be mapped using a known "hashing" algorithm or tool, such as Murmur32 (for 32 bit), which provides a unique integer value for each title (also referred to herein as StringHash mapping).

Referring to FIG. 9B, the data type counter table 950 shows an example of the type counter that is used to tally how many of each data type (non-Boolean) occurring in analyzing the user data which may be used by the Analyzer Logic to determine the mapping strategy for the conformed data set. The far left column the table 950 shows the attribute name (e.g., Team Name, Browser, Device ID, Title, etc.) and the next four columns show the total tally (or total count) of how many times that attribute was identified as an Integer, Floating point number, Date, and String, respectively. These values may be used to determine the mapping strategy as discussed herein.

In some embodiments, the Data Statistics Logic 800 may use the "Type" field provided in the Conform Mapping Schema to determine certain statistics about the data, e.g., Boolean, floating point, integer, and the like. In that case, the logic 800 may be simplified (e.g., by not needing to parse the data values to determine data type), and may use the information in the Type field to make this determination.

Referring to FIG. 10, a flow diagram 1000 illustrates one embodiment of a process or logic for implementing block 716 of the Analyzer Logic (FIG. 7) for determining and updating the mapping strategy for attributes, which may be implemented using the Analyzer—Mapping Strategy Logic 1000. The logic 1000 begins at a block 1002, which determines if the attribute data type is has been marked as Boolean. If so, block 1004 maps the attribute as Boolean (BoolDirect) having a Standard (Std) Bitmap data format and the logic proceeds to block 1026 where the Field and Mapping Strategy are saved in the Bitmap Mapping Schema file and the logic exits. If the result of block 1002 is NO, block 1006 determines if the Date Counter is greater than the Integer Counter and if the Date Counter is greater than 99% of the total value count for that attribute. Other threshold values for the Date Counter may be used if desired. If Yes, block 1008 maps the attribute as DateTime having a Bit-Sliced Index (BSI) Bitmap data format (DateBSI) and the logic proceeds to block 1026 where the Field and Mapping Strategy are saved in the Bitmap Mapping Schema file. BSI data format is discussed in more detail hereinafter.

If the result of block 1006 is NO, block 1010 determines if the Float Counter is greater than one (1), i.e., a single occurrence of floating point may be sufficient to set it as Float. Other threshold values for the Float Counter may be used if desired, such as 2 to 100 to allow for data entry errors or ID codes having decimal points, or X% of the values may be used (similar to that used for the integer or date counters). If Yes, block 1012 maps the attribute as Float having a Bit-Sliced Index (BSI) Bitmap data format (IntBSI) and the logic proceeds to block 1026 where the Field and Mapping Strategy are saved in the Bitmap Mapping Schema file and the logic exits. If the result of block 1010 is NO, block 1014 determines if the Integer Counter is greater than 99% of the total value count for that attribute. Other threshold values for the Integer Counter may be used if desired. If Yes, block 1016 maps the attribute as Integer and the logic proceeds to block 1026 where the Field and Mapping Strategy with the corresponding Bitmap data format (Std Bitmap or BSI) are saved in the Bitmap Mapping Schema file and the logic exits.

If the result of block 1014 is NO, the attribute is being handled as a "String" and block 1018 determines if it is a High Cardinality String. If Yes, block 1020 maps the attribute as Hashed String having a Bit-Sliced Index (BSI) Bitmap data format (StringHashBSI) and the logic proceeds to block 1026 where the Field and Mapping Strategy with the corresponding Bitmap data format (Std Bitmap or BSI) are saved in the Bitmap Mapping Schema file and the logic exits. If the result of block 1018 is NO, the attribute is not a High Cardinality String and, thus, can be handled as an enumerated string and block 1022 maps the attribute as an Enumerated String having a Standard (Std) Bitmap data format (StringEnum). Next, block 1024 obtains the enumerated string (from a predetermined string/code mapping table, not shown) and saves the Enumerated String Value in the Bitmap Mapping Schema file. Next block 1026 saves the Field and Mapping Strategy for the StringEnum with the corresponding Bitmap data format (Std Bitmap or BSI) in the Bitmap Mapping Schema file and the logic exits.

Accordingly, as shown above, in some embodiments, the Analyzer Logic chooses a mapping strategy for a given Field and also determines if the Field will be mapped as a Std Bitmap or BSI data format. For convention, the present disclosure appends a "BSI" to the strategy label (see FIG. 11) to indicate it is being mapped as a BSI format, such as StringHashBSI, IntBSI, DateBSI, SysMilliBSI and the like. In particular, dates and timestamps are mapped as BSI to allow for range searches to be performed on the data, such as the mapping strategy for "millisecond granularity" timestamps as BSI or SysMilliBSI. Strings that are enumerated (each string associated with a unique value), are mapped as Standard (or Std) Bitmap, e.g., StringEnum. Integers may be mapped as either Std Bitmap (IntDirect) or BSI (IntBSI). In FIG. 11 column 1108, the Fields Age and registered_DMA_id are mapped as Std Bitmap (IntDirect) (also shown in FIG. 12 for Age, rows 1246, 1248, 1250), whereas the Fields: Device_ID, St_Tm_Fav_TeamID, St_Tm_Fav_SportID, ContAct-Video_Duration are mapped as BSI (IntBSI). However, in some embodiments, age may be mapped as a BSI. Also, story title (ContAct-Story_Title), and video title (ContAct-Video_Title) may be hashed to strings and stored as integers or codes with discrete values (StringEnum) or stored as BSI (StringHashBSI) instead. If integers are mapped both ways in the user data set (for different fields), the Analyzer Logic, e.g., at the Block 1016 in the process 1000 (FIG. 10), may set the appropriate integer mapping, e.g., IntDirect or IntBSI, based on the Field.

Referring to FIG. 11, a sample of the Bitmap Mapping Schema 210 is shown, which shows in columns from left to right as: Source Attribute Name 1102, Source Type 1104, Field Name 1106, Mapping Strategy 1108, Fraction Length 1110 (max. #of places to right of decimal point), Min. Value 1112, Max. Value 1114, Max. Character Length 1116, Values 1118 (associated with Rows in the Field), RowIDs 1120 (which Rows are used in the Field). The number of rows used for a given Field in the bitmap will depend on the mapping strategy and associated metadata (as discussed herein).

There are two "Source" columns 1102,1104 provided from the Conformed User Data Set 206 (FIG. 5). The Source Attributes column 1102 is derived from the Parent and Child Attribute columns 502,504 in the Conformed Data Set 206, which are combined or collapsed into the Source Attribute column 1102, and the Source Type 1104, which is provided (if available) in the Conformed User Data Set 206. The remaining columns 1106-1120 in the Bitmap Mapping Schema 210 are populated by the Analyzer Logic 208 after it analyzes the Conformed User Data Set for each of the users (or UserIDs) and characterizes the data for loading (or writing) into bitmap format, and may be referred to herein generally as "statistics" or "metadata", which describes the data stored in the Conformed User Data Set 206.

The data in the Bitmap Mapping Schema 210 may be used by the Loader Logic 212 to call the Bitmap Loading Tool 214 to load the user data set into the Bitmap Index 220. For example, the Field Name 1106, and the Row ID (which row in the field) and Column ID (which UserID) may be used to tell the Bitmap Loading/Query Tool 214 what locations in the Bitmap Index file 220 to populate with 0's and 1's to create the bitmap representation of the Conformed User Data Set 206. Also, certain of the columns 1108-1120 to the right of the Field Name may be referred to herein as "Metadata" or "Detailed Metadata", which may be used by the Loader Logic 212 to create the call format needed by the Bitmap Loading/Query Tool 214 to load the Bitmap Index file 220.

For example, the "UserID" Field (or Attribute), from the Field column 1106 has a StringHashBSI mapping strategy 1108, the values for the Field having a Max. Value of "4,294,967,295", with a Max. Character length of 69 characters. The RowIDs 1120 and Values 1118 for each RowID are not shown as this will be mapped as an integer from a "hashing" algorithm that assigns a unique integer value for a string that has many possible values (e.g., more than 500), and that value may be used in the call to the Bitmap Loader/Query Tool 214.

As another example, the "Gender" Field (or Attribute) 1106 has a StringEnum mapping strategy 1108, the values for the Field having a Max. Character Length 1116 of "1" character, with specific Values of M, F, U (male, female, and unknown) (from the Values col. 1118), which will use or occupy three rows, Row1, Row2, Row3, in the "Gender" Field in the Bitmap (from the RowIDs column 1120). The other rows shown in FIG. 11 of the Bitmap Mapping Schema 210 may have similar or related functions and correspondence to the Bitmap, as described further herein.

Figure 12:
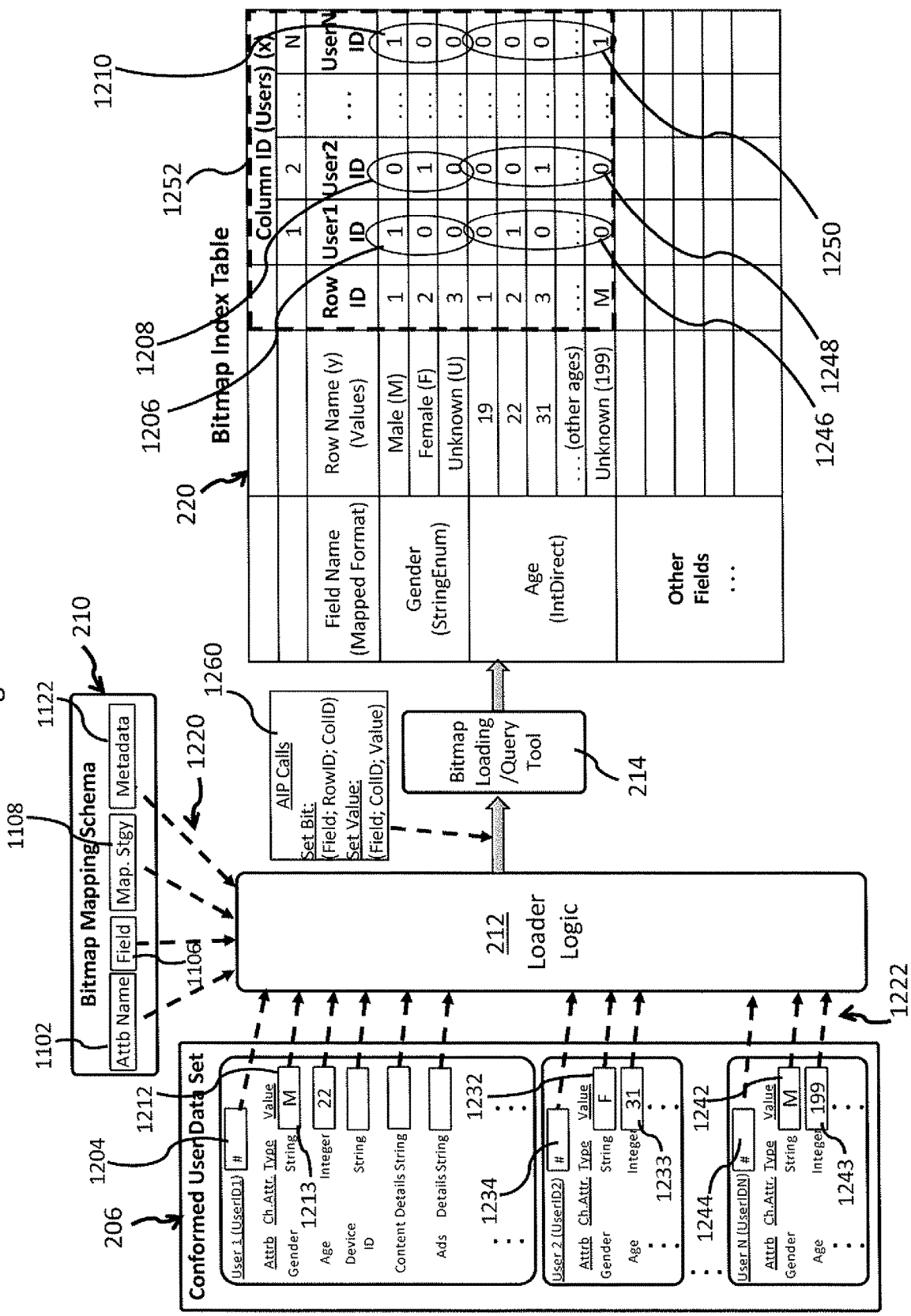
FIG. 12 is an illustration of how the Loader Logic creates the Bitmap Index User Data Set for each user using the Conformed User Data Set and the Bitmap Mapping Schema, in accordance with embodiments of the present disclosure.

Referring to FIG. 12, an illustration is shown of how the Loader Logic 212 creates the output Bitmap Index table 220 having values from the Conformed User Data Set 210 in bitmap format for each user (User1 to UserN), using the Bitmap Mapping Schema 210. In particular, the Loader Logic 212 receives (or retrieves) each Source Attribute 1102 and the output data structure for the bitmap (Field 116, Mapping Strategy 1108, and Metadata 1122) for the Attribute/Child-Attribute (or Sub-Attribute) from the Bitmap Mapping Schema 210, as indicated by lines 1220. The Loader Logic retrieves the user data values for each source Attribute from the Conformed User Data Set 206, as shown by the lines 1222 and uses the Bitmap Mapping Schema to create and send a command or call 1260 (or Application Programming Interface (API) call or command), e.g., "Set Bit" or "Set Value", to the Bitmap Loading/Query Tool 214 to load the bitmap 220. Other API call formats may be used if desired, depending on the type of Bitmap Loading/Query Tool 214 used to load (or set the 1's and 0's in) the bitmap.

When finished, the Loader Logic 212 sends the appropriate commands to cause the Bitmap Loading/Query tool 214 to load the data values from the Conformed User Data Set 206 into the Bitmap Index table 220.

For example, the "UserID1" attribute for User1 value 1204 is read by the Loader Logic 212 and uses it to populate the Column ID portion of an API call (or command) to the Bitmap Loading/Query Tool 214, which would be the Column corresponding to UserID1 in the Bitmap Index Table 220.

Similarly, the "Gender" Attribute 1212 is read by the Loader Logic 212, which uses it to create the Field, Row ID, and Value portions (as appropriate) of the API call to the Bitmap Loading/Query Tool 214 based on the Field Name 1106 (FIG. 11), the other Metadata 1122 (FIG. 11) in the Bitmap Mapping Schema 210. In this case, the "Gender" Attribute 1212, 1232, 1242, for User1, User2, User3, respectively, are mapped as a string enumeration (StringEnum) having three values (M, F, U), each value corresponding to a row in the Bitmap (Row1, Row2, Row3), as shown by regions 1206, 1208, 1210 in the Bitmap Index File Table 220 (or Bitmap) for User1, User2, UserN, respectively.

In particular, for the example shown in FIG. 12, for User 1 (corresponding to Col. 1), the actual user data value for Gender is "M", which is shown by the region 1206 in the Bitmap 220 in Column 1 (for UserID1) as having a bit value of "1" in Row1 corresponding to "M", and bit values of "0" for Row2 and Row3, corresponding to data values of F and U, respectively. Similarly, for User2, corresponding to UserID #1234, the actual user data value for Gender is "F", which is shown by the region 1208 in the Bitmap 220 in Column 2 (for UserID2) as having a bit value of "1" in Row2 corresponding to "F", and bit values of "0" for Row1 and Row3, corresponding to user data values of M and U, respectively. Lastly, for UserN, corresponding to UserID #1244, the actual user data value for Gender is "M", which is shown by the region 1208 in the Bitmap 220 in Column 2 (for UserID2) as having a bit value of "1" in Row1 corresponding to "M", and a bit value of "0" for Row2 and Row3, corresponding to data values of F and U, respectively. A similar technique is used for the Gender values for other Users (Column IDs) in the Bitmap. Also, a similar technique may be used for the other integer direct (StringEnum) Fields in the Bitmap.

Similarly, the "Age" Attribute 1212 is read by the Loader Logic 212, which uses it to create the Field, Row ID, and Value portions (as appropriate) of the API call to the Bitmap Loading/Query Tool 214 based on the Field Name 1106 (FIG. 11), the other Metadata 1122 (FIG. 11) in the Bitmap Mapping Schema 210. In this case, the "Age" Attribute 1213, 1233, 1243, for User1, User2, User3, respectively, are mapped as an integer (IntDirect) having values from Age1 to AgeM, each age value corresponding to a row in the Bitmap (Row1 to RowM), as shown by regions 1246, 1248, 1250 in the Bitmap Index Table 220 (or Bitmap Index User Data Set) for User1, User2, UserN, respectively. In addition to the specific values of age, the field may have assigned a value, e.g., Unknown (value=199), for an unknown age, used if the age data is not available or not entered for that user or the age value does not make sense, such as an age typo of, e.g., 250 years old.

In particular, for the example shown in FIG. 12, for User 1, the actual user data value for Age is "22", which is shown in the Bitmap 220 as having a bit value of "1" in Row2 corresponding to "22", and a bit value of "0" for Row1 and Row3, corresponding to data values of 19 and 31, respectively. Similarly, for User2, the actual user data value for Age is "31", which is shown in the Bitmap 220 as having a bit value of "1" in Row3 corresponding to "31", and a bit value of "0" for Row1 and Row2, corresponding to data values of 19 and 22, respectively. Lastly, for UserN, the actual user data value for Age is "199", which corresponds to the unknown code, which is shown in the Bitmap 220 as having a bit value of "1" in RowM corresponding to "199", and a bit value of "0" for Row1 to Row3 and all other rows up to RowM, corresponding to data values other than 199. A similar technique may be used for the other integer direct (IntDirect) Fields in the Bitmap.

In some embodiments, as indicated above, the Bitmap Index Table 220 (or file) may store numbers (e.g., integers) as a "BSI" (or Bit-Sliced Index) bitmap data format. In that case, a set of integer values may be more efficiently stored in the bitmap using a binary code across a plurality of rows (in a given Field) instead of having a row associated with each integer value. For example, if the range of potential Ages is 1-127, this range of integers can be mapped in binary code using only 7 bits (i.e., 0000000 to 1111111), and thus 7 rows, instead of using 127 rows, thereby reducing the size of the bitmap by 120 rows. Using a BSI Bitmap approach also allows the ability to efficiently search a range of values, e.g., people between the ages of 20-25, which is useful when range queries are needed. The BSI Bitmap approach can be used with any mapping strategies that provide an integer-type value.

When using a BSI Bitmap, the API call 1260 from the Loading Logic 212 to the Bitmap loading/query tool 214 would be a "Set Value" call, including: Field (e.g., "Age"), Column ID (for UserID, e.g., UserID=1234), and Value (for age value of the user, e.g., 33 yrs old). Thus, in that case, the API call would be: Set Value (Age, 1234, 33). The Bitmap Loading/Query Tool 214 selects the appropriate number of Bitmap rows (or bits) for the Field to accommodate the size range for that Field in the Bitmap Index Table 220. In some embodiments, the API call may include an indication that BSI is the desired Bitmap storage format to be used for this Field or data value.

Figure 13:
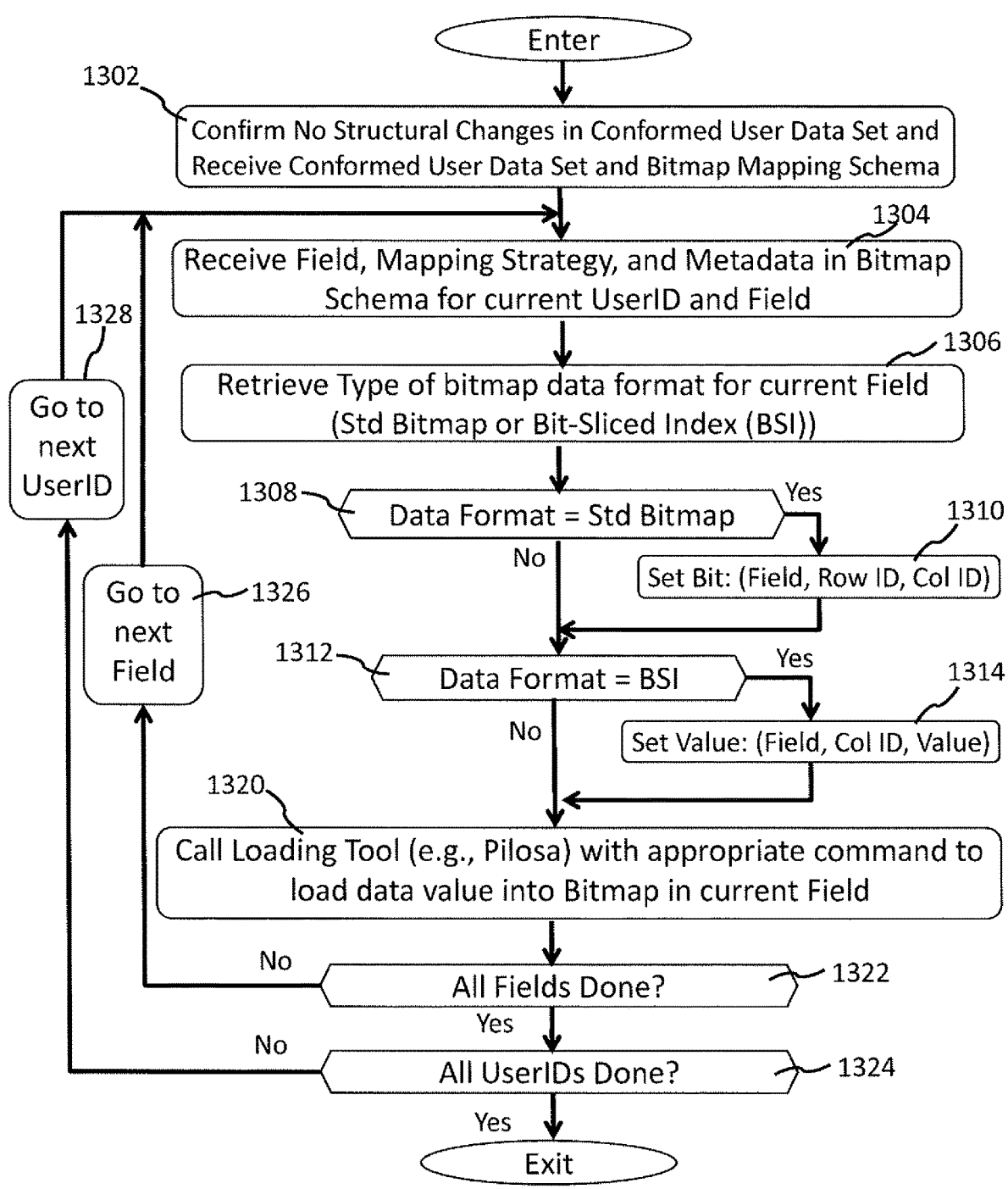
FIG. 13 is a flow diagram of one embodiment of Loader Logic, in accordance with embodiments of the present disclosure.

Referring to FIG. 13, a flow diagram 1300 illustrates one embodiment of a process or logic for implementing the Loader Logic 212 (FIGS. 2 and 12), of block 260 (FIG. 2A) of the Bitmap Creation Logic 75 (FIGS. 1 and 2), which loads the latest update of the Conformed User Data Set 206 (having the most recent user data values) into the Bitmap Index User Data Set 220 (or Bitmap Index Table) for each UserID, using the Bitmap Mapping Schema 210. The logic 1300 begins at a block 1304, which receives the Field, Mapping Strategy and other metadata in the Bitmap Mapping Schema 210. Next, block 1306 retrieves the type of bitmap data format from the mapping strategy, e.g., Standard (Std) Bitmap (or X,Y integer representation) or Bit-Sliced Index (BSI) bitmap for the current field. Next, block 1308 checks if the data format is Std Bitmap. If so, block 1310 sets the API call to "Set Bit (Field, Row ID, Col. ID)", where Field is the field for where the data bit located at the Row ID (indicating data value in the Field) and Col ID (indicating the UserID) is to be set to one (1).

Next, or if the result of block 1308 is NO, block 1312 checks if the data format is a Bit-Sliced Index (BSI) format. If so, block 1314 sets the API call to "Set Value (Field, Col.

ID, Value)", where Field is the field having a collection of Rows for which data bits will be set as a binary code indicative of the Value, Col ID (indicating the UserID) and Value is the actual value of the data for Field being written.

Next, or if the result of block 1312 is NO, block 1320 performs the API call (or sends the command) to the Bitmap Loading tool 214 (e.g., Pilosa) with the appropriate command format to load the value(s) of the data into the Bitmap for the current Field. In some embodiments, the block 1320 may include timestamp information relating to the data stored, provided it is supported by the Bitmap Loading Tool. For example, all "Standard bitmaps" may have an added third dimension of time, referred to herein as time "slice". Thus, for the data fields not mapped as BSI, the data may be stored using the time dimension. In that case, for each daily load of user data stored by the Loader Logic in the bitmap, the block 1320 may also indicate which time "slice" is associated with the user data being loading it the bitmap. The granularity of the time "slice" is based on the Loading Tool, e.g., weekly, daily, hourly, minute, second, millisecond, or the like. In some embodiments, the logic updates once per day (daily), in which case, the time "slice" data would use daily granularity (if supported by the Loading Tool). In some embodiments, the Loading Tool may not support time slicing for BSI bitmap fields. In that case, for BSI bitmap fields, the last data set loaded is the most current.

As discussed herein, some embodiments of the present disclosure may use "Roaring" bitmap for the bitmap structure, although Roaring is just one possible implementation that may be used by the Bitmap Loading/Query Tool 214. Roaring is a software platform that enables the creation of bitmaps or bitmap index data sets. In some embodiments, Pilosa software (an open source implementation of Roaring) may be used for the Bitmap Loading/Query Tool 214; however, other implementations of Roaring may also be used within the present disclosure. Pilosa may be viewed as a tool to write to (or load) the bitmap data set, and its detailed operations are not critical to understanding the present disclosure. In practice, there may be software "wrappers" built around a Pilosa stack which the Loader Logic may just use with the appropriate call functions or APIs, e.g., "Set Bit", "Set Value", and the like. More information about Pilosa and Roaring bitmaps may be found at the websites: https://www.pilosa.com/docs and http://roaringbitmap.org, respectively, which are incorporated herein by reference to the extent needed to understand the present disclosure. In some versions of Pilosa, the term "Fields" may also be referred to as "Frames".

Next, block 1322 determines if all the Fields have been written. If not, block 1326 goes to the next Field and the logic returns to block 1304 to receive data associated with the next Field for the current UserID. If the result of block 1322 is Yes, all Fields have been written for this UserID, and block 1324 determines if all UserIDs have been written. If not, block 1328 goes to the next UserID and the logic returns to block 1304 to receive data associated with the next UserID (for all the Fields). If the result of block 1324 is Yes, all UserIDs have been written for all of their respective Fields, the loading of the Bitmap Index User Data Set 220 is complete, and the logic 1300 exits.

Referring to FIGS. 14A and 14B, example of at least a portion of a resulting Bitmap Index Table 220 is shown as may be created by the system and method of the present disclosure. In particular, in FIG. 14A, Fields such as Gender, Age, Browser, Plays_Fantasy, Location_State, Location_City, Other Location Fields/Attributes, St_Tm_Fav_Name, and St_Tm_Fav_Sport are shown, together with the Mapped Format for each Field (from the Mapping Strategy in the Bitmap Mapping Schema 210). Also, in FIG. 14B, Fields such as ContAct-Source, ContAct-Video_Title, CotAct-Device, Other ContAct Fields/Attributes AdsAct-Source, AdAct-AdvName, AdsActs-Device, and Other AdsActs Fields/Attributes are shown, together with the Mapped Format for each Field (from the Mapping Strategy in the Bitmap Mapping Schema 210). Where the first two fields in FIG. 14A (Gender and Age) are the same as that shown in FIG. 12, and some of the other Fields shown in FIGS. 14A and 14B are a selection of those shown in FIG. 11 (Bitmap Mapping Schema). Also, FIGS. 14A and 14B shows sample data bits set to 1 and 0 for several users (User1ID, User2ID, User3ID . . . UserNID).

Figure 16:
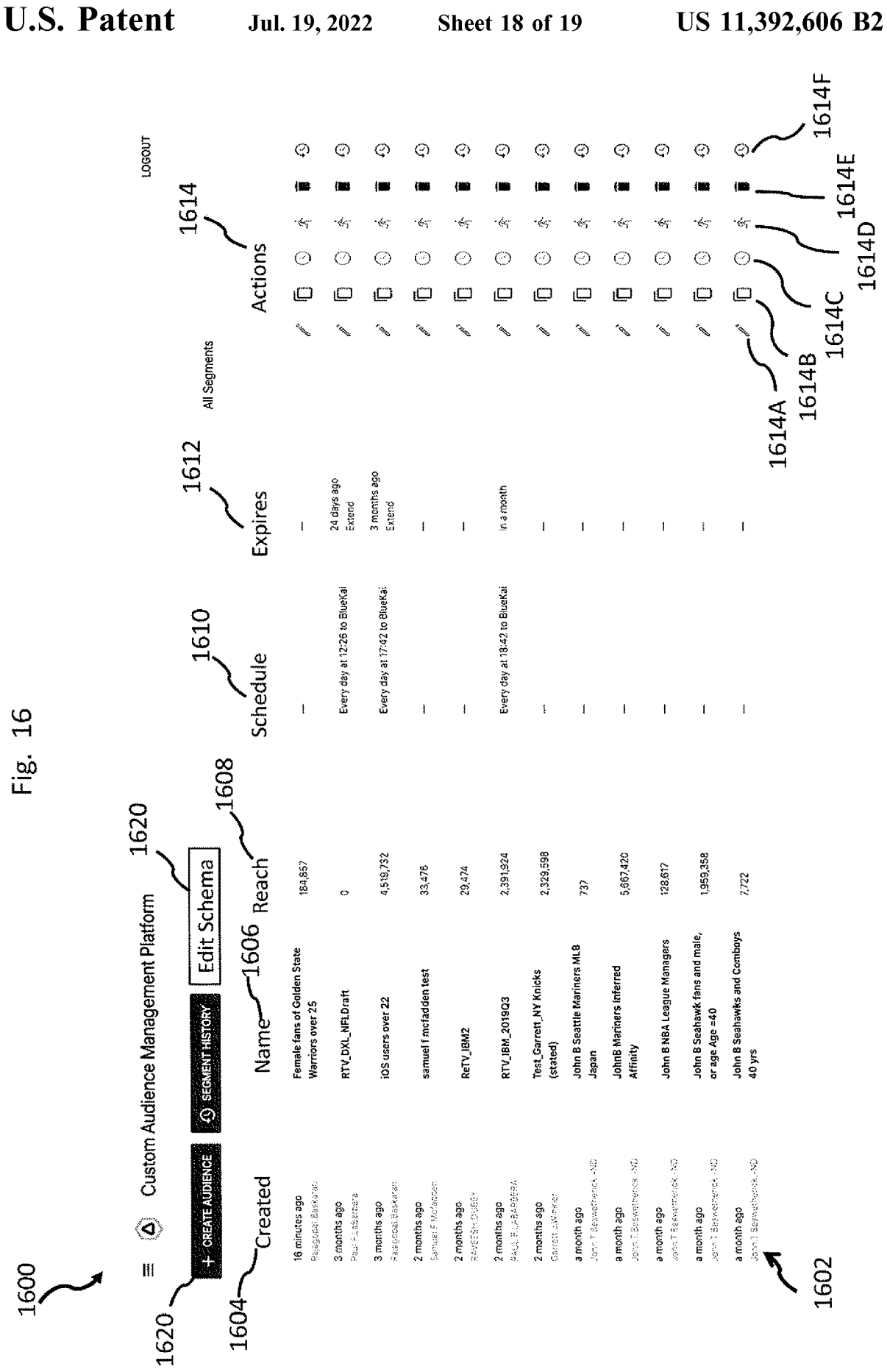
FIG. 16 is a screen illustration of a graphic user interface for a landing page of a Query UI software application used to search bitmap content, in accordance with embodiments of the present disclosure.
Figure 17:
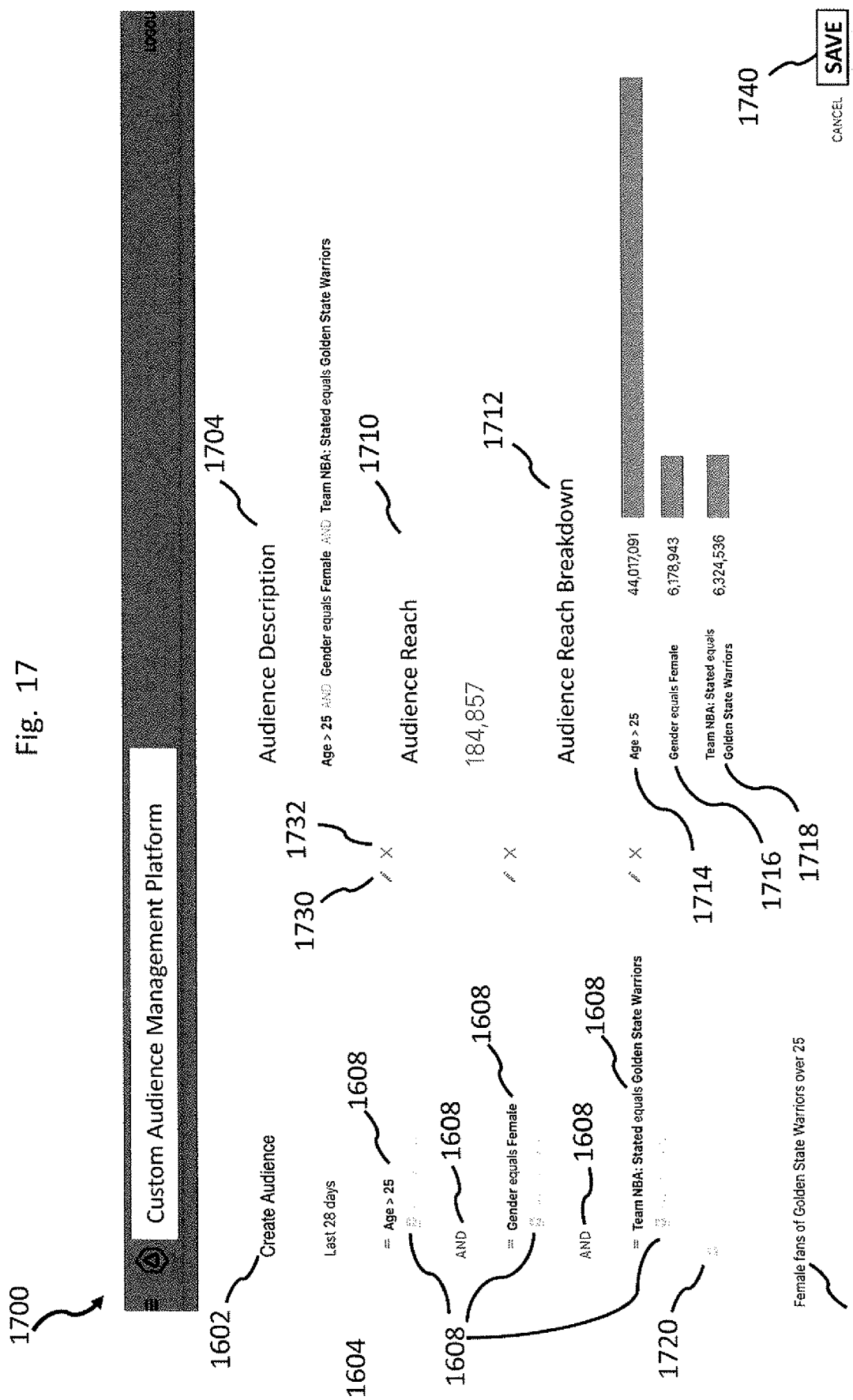
FIG. 17 is another screen illustration of a graphic user interface for the Query UI software application of FIG. 16, in accordance with embodiments of the present disclosure.

Referring to FIGS. 15, 16 and 17, a flow diagram 1500 (FIG. 15) illustrates one embodiment of a process or logic for implementing the Query UI App Logic (FIGS. 1 and 2), which may reside on the Client Device or Computer 84 (FIG. 1) and which, when launched (e.g., by the Client 88), receives inputs from the Client 88, the Bitmap Mapping Schema 210, the Bitmap Index User Data Set 220 and displays (or sends or provides) a Bitmap Query User Interface (UI) including search fields (or components or attributes), search conditions and tools, and provides Bitmap query results. The Logic begins at block 1502, which displays a main user interface (UI) landing page 1600 (FIG. 16).

Referring to FIG. 16, the landing page 1600 screen illustration includes a Custom Audience Management Platform overview screen, which shows a listing 1602 of queries (or searches or segments) that have been previously searched and saved in the Query UI App 86 or on the Device 84 (or other device or server). For each segment/query in the list 1602, the screen illustration (or screen shot) 1600 shows when the query was created 1604, query name 1606, query "reach" 1608 (i.e., size of audience), schedule for re-running query 1610, and when the query schedule (if any) expires 1612. In addition, the screen shot 1600 provides a series of selectable actions (or tools) icons 1614 associated with (or to perform an action on) each segment or query in the list 1602. In particular, from left to right, the icons 1614 include edit segment 1614A, copy (segment definitions) 1614B, set-up schedule for query to run 1614C, run query now 1614D, delete query 1614E, history when query was last run 1614E. Also, there is a selectable "Create Audience" button 1620, which allows the client to create a new query or segment (or an audience query).

Referring to FIG. 15, next, block 1504 determines if a segment item on the listing 1602 has been clicked on (or selected). If so, block 1508 displays the details of the query segment item selected on a separate pop-up screen (not shown). If the result of block 1504 is NO, block 1506 determines if one of the action icons 1614 has been selected. If so, block 1507 displays a UI screen for the requested action and allows the Client to perform the indicated action. If the result of block 1506 is NO, block 1510 determines if the "Create Audience" button 1620 has been selected. If not, the logic exits. If the result of block 1510 is YES, block 1512 displays an Audience Creation screen (FIG. 17) having selectable attributes and fields as determined by the Bitmap data and the Bitmap Mapping Schema.

Referring to FIG. 17, the landing page 1700 screen illustration for Create Audience 1702 is shown, which shows the creation of a query 1720 ("Female fans of Golden State Warriors over 25 yrs old"), having an Audience Description 1704 of: Age>25 and Gender=Female and Team NBA: Stated=Golden State Warriors. The three search components (or attributes or fields) 1704A, 1704B, 1704C, of the query 1704 are also shown on the screen 1700 as well as the search conditions ("and") 1706, 1708 between each search component. The screen also provides action icons to edit 1730 and to delete 1732 for each of the search components, and a "+" icons 1734 to add further filters to each of the search components or a "+" icon 1736 to add additional search components. The resulting query can also be saved for future reference and added onto the master list 1602 (FIG. 16) by selecting the "Save" button 1740 in the lower right of the screen. The saved queries may be retrieved later to add new search components or conditions, or modify or delete existing components or conditions.

In the example of FIG. 17, the Audience Reach 1710 for the query is 184,857 people, and the Audience Reach Breakdown 1712 is shown for each of the search components, as follows: for Age>25, audience reach 1714 is 44,017,091; for Gender=Female, the audience reach 1716 is 6,178,943; and for Team NBA: State=Golden State Warriors, the audience reach 1718 is 6,324,536.

Referring again to FIG. 15, after block 1512 displays the Create Audience screen 1700, block 1514 receives the Audience Creation attributes/fields and conditions from the Client (as shown in FIG. 17). Next, block 1516 performs the Bitmap query with the selected fields and conditions. Next, the logic at block 1518 displays the results of the query including: Audience Description 1704, Audience Reach 1710, and Audience Breakdown 1712.

Next, a block 1520 determines if an "Edit Schema" Selection has been received. If so, block 1522 displays a landing page on a separate pop-up screen (not shown) which allows the Client to edit/remove/add attributes/fields or associated values of the selected the Conform Mapping Schema and the Bitmap Mapping Schema, and to save the results, and then the logic exits.

Accordingly, the UI provides conditions to present to the Client 88 for creating the query attributes/fields and conditions and possible values. The Bitmap Mapping Schema 210 (or Config. File) together with the Bitmap Loading/Query Tool 214 (e.g., Pilosa) may be used both to load the data into the Bitmap and to create the user interface (UI). In some embodiments, the UI or App 86 may be implemented as a wizard-type interface if desired.

In some embodiments, the data sources may have a direct (or indirect) link to the bitmap creation logic. Also, in some embodiments, all the data sources may be normalized or conformed to the conform mapping schema before being fed to the bitmap server logic. Further, the conform schema may be used as the source for the bitmap creation logic.

The present disclosure includes systems for improving the speed of obtaining query results from a massive, disparate data set by converting data to bitmap as recited herein, querying the bitmap dataset, returning a result, wherein massive means larger than 1 million (or 10 million or 100 million) number of records (or users or items) each user or item having a plurality of attributes (e.g., 2, 10, 100, 1000, 10,000, 100,000 attributes) and disparate means from at least 3 (e.g., 3, 5, 10, 100, 1,000) different sources in at least 3 (e.g., 3, 5, 10, 100, 1,000) different data formats or types.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:
1. A method for converting user data from a plurality of users and from a plurality of disparate data sources to bitmap data, comprising:
receiving the user data from the plurality of data sources, the user data indicative of user attributes;

receiving a conform mapping schema;
creating a conformed user data set for the plurality of users using the conform mapping schema;
wherein the creating the conformed user data set comprises reconciling conflicts in data types for the same attribute between different data sources using the conform mapping schema;
analyzing the conformed user data set to obtain statistics about the user data for each user attribute;
creating a bitmap mapping schema based on the statistics about the user data set;
loading the conformed user data set into a bitmap data set using the bitmap mapping schema;
wherein the analyzing is only performed initially and when the conformed user data set has changed and the bitmap mapping schema is updated only when the conformed user data set has changed; and
providing a user interface (UI) where queries are performed on the bitmap data set, and which provides a plurality of selectable fields and conditions based on the bitmap data for a client to perform a search of the bitmap data set.

2. The method of claim 1, wherein the conform mapping schema comprises at least one of: parent attributes, child attributes, attribute data type, and mapping rules.

3. The method of claim 2, wherein the mapping rules comprises data source and field.

4. The method of claim 2, wherein the mapping rules comprises data source, field and mapping logic.

5. The method of claim 1, wherein the conformed user data set comprises attributes, data type, and user data for each user, the data type for a given attribute having a common format for all users independent of the data source.

6. The method of claim 1, wherein the statistics are obtained for all the data values of each attribute for all users.

7. The method of claim 6, wherein the statistics comprises at least one of: data type, number of occurrences of each data type; min. and max. value of each number (integer or floating point), and cardinality of each string value.

8. The method of claim 7, wherein the data type is selected from the group comprising: Boolean, Integer, Floating Point, Date, and String.

9. The method of claim 1, wherein the analyzing the conformed user data set comprises determining a mapping strategy for each field based on the statistics.

10. The method of claim 9, wherein the analyzing comprises determining the type of bitmap data format for a given field, wherein the type of bitmap comprises one of: standard bitmap and BSI bitmap.

11. The method of claim 9, wherein the determining is based on the number of occurrences of a given user attribute having a given data type is greater than a predetermined threshold.

12. The method of claim 1, wherein the loading comprises creating API calls having a field and a Column ID indicative of a user and at least one of a Row ID and a Value.

13. The method of claim 10, wherein the loading comprises retrieving the type of bitmap data format for a given field and creating API calls based on the mapping strategy.

14. The method of claim 1, wherein the bitmap data set comprises columns corresponding to each of the users, rows corresponding to fields indicative of the user attributes in the conform user data set, and values that correspond to the user data values and a mapping strategy.

15. The method of claim 1, further comprising determining if the mapping schemas have errors or require updates and correcting or updating the appropriate schema accordingly.

16. The method of claim 1, wherein the user interface (UI) provides an option to edit, remove or add attributes or attribute values to a mapping schema.

17. A method for converting user data from a plurality of users and from a plurality of disparate data sources to bitmap data, comprising:
receiving the user data from the plurality of data sources, the user data indicative of user attributes;
receiving a conform mapping schema;
creating a conformed user data set for the plurality of users using the conform mapping schema;
wherein the creating the conformed user data set comprises reconciling conflicts in data types for the same attribute between different data sources using the conform mapping schema;
analyzing the conformed user data set to obtain statistics about the user data for each user attribute;
creating a bitmap mapping schema based on the statistics about the user data set;
loading the conformed user data set into a bitmap data set using the bitmap mapping schema;
wherein the analyzing is only performed initially and when the conformed user data set has changed and the bitmap mapping schema is updated only when the conformed user data set has changed; and
providing a user interface (UI) where queries are performed on the bitmap data set.

18. The method of claim 17, wherein the conform mapping schema comprises at least one of: parent attributes, child attributes, attribute data type, and mapping rules.

19. The method of claim 18, wherein the mapping rules comprises data source and field.

20. The method of claim 17, wherein the conformed user data set comprises attributes, data type, and user data for each user, the data type for a given attribute having a common format for all users independent of the data source.

21. The method of claim 17, wherein the analyzing the conformed user data set comprises determining a mapping strategy for each field based on the statistics.

22. The method of claim 21, wherein the analyzing comprises determining the type of bitmap data format for a given field based on the mapping strategy, wherein the type of bitmap comprises one of: Standard bitmap and BSI bitmap.

23. The method of claim 22, wherein the loading comprises retrieving the type of bitmap data format for a given field and creating API calls based on the mapping strategy.

24. The method of claim 17, wherein the bitmap data set comprises columns corresponding to each of the users, rows corresponding to fields indicative of the user attributes in the conform mapping schema, and values that correspond to the user data values and a mapping strategy.

25. The method of claim 17, wherein the user interface (UI) provides a plurality of selectable fields and conditions based on the bitmap data for a client to perform a search of the bitmap data set.

26. The method of claim 17, wherein the user interface (UI) provides an option to edit, remove or add attributes or attribute values to a mapping schema.

27. A method for improving the speed of obtaining query results from a massive, disparate data set, comprising:

converting the data to bitmap data set format, comprising:
   receiving the data from the plurality of data sources, the user data indicative of user attributes;
   receiving a conform mapping schema;
   creating a conformed user data set for the plurality of users using the conform mapping schema;
   analyzing the conformed user data set to obtain statistics about the user data for each user attribute;
   creating a bitmap mapping schema based on the statistics about the user data set; and
   loading the conformed user data set into a bitmap data set using the bitmap mapping schema;
   wherein the creating the conformed user data set comprises reconciling conflicts in data types for the same attribute between different data sources using the conform mapping schema;
   wherein the analyzing is only performed initially and when the conformed user data set has changed and the bitmap mapping schema is updated only when the conformed user data set has changed;
querying the bitmap data set;
returning a query result; and
wherein massive comprises larger than 1 million records, each record having a plurality of attributes and disparate comprises at least 3 different data sources in at least 3 different data formats or types.

* * * * *